United States Patent [19]

Honda et al.

[11] Patent Number: 5,661,530
[45] Date of Patent: Aug. 26, 1997

[54] TELEVISION CIRCUIT UTILIZING COLOR BURST SIGNAL

[75] Inventors: Fumiaki Honda, Takatsuki; Nobukazu Hosoya, Ikoma-gun, both of Japan

[73] Assignee: Sanyo Electric Co., Ltd., Moriguchi, Japan

[21] Appl. No.: 212,890

[22] Filed: Mar. 15, 1994

[30] Foreign Application Priority Data

Mar. 17, 1993 [JP] Japan ..................... 5-056670
Jan. 28, 1994 [JP] Japan ..................... 6-008161

[51] Int. Cl.$^6$ ........................................ H04N 9/70
[52] U.S. Cl. ............... 348/643; 348/644; 348/679
[58] Field of Search ................. 348/643, 644, 348/621, 622, 645, 619, 607, 618, 627, 630, 652, 653, 654, 673, 683, 687, 688; 358/315, 316, 317, 320, 326, 329; H04N 5/21, 5/213, 9/45, 9/68, 9/70

[56] References Cited

U.S. PATENT DOCUMENTS

| | | | |
|---|---|---|---|
| 4,092,667 | 5/1978 | Akazawa et al. | 348/644 |
| 4,554,596 | 11/1985 | Shibata et al. | 358/330 |
| 4,797,730 | 1/1989 | Smith | 358/19 |
| 5,153,714 | 10/1992 | Ugaki et al. | 358/31 |
| 5,177,600 | 1/1993 | Monta et al. | 348/630 |
| 5,208,678 | 5/1993 | Nakagawa | 358/341 |
| 5,392,074 | 2/1995 | Watanabe et al. | 348/645 |
| 5,452,016 | 9/1995 | Ohara | 348/643 |

FOREIGN PATENT DOCUMENTS

| | | | |
|---|---|---|---|
| 0573295A2 | 6/1993 | European Pat. Off. | H04N 9/68 |
| 63139492A | 12/1986 | Japan | H04N 9/68 |
| 406125566A | 5/1994 | Japan | H04N 9/68 |
| 2182818 | 10/1986 | United Kingdom | H04N 9/45 |

OTHER PUBLICATIONS

IEEE Transactions of Broadcasting, vol. 38, No. 1, Mar. 1992, New York (US) pp. 19–26; Douglas W. Irwin et al. 'Hybrid Clamping in NTSC Digital Video Equipment'.

European Search Report (Date of Completion: Feb. 27, 1995).

*Primary Examiner*—Victor R. Kostak
*Attorney, Agent, or Firm*—Armstrong, Westerman, Hattori, McLeland & Naughton

[57] ABSTRACT

A television circuit (10) according to the invention includes a multiplier (12), and a voltage signal (V1) is outputted from an LPF (22) in accordance with the presence or absence of a color burst signal which is to be inputted to the multiplier (12). A rectangular-wave signal (Va) is obtained on the basis of the voltage signal (V1) through a peak holding circuit (24) and a sampling/holding circuit (42). A rectangular-wave signal (Vc) is obtained by averaging the rectangular-wave signal (Va) and a rectangular-wave signal (Vb) which is obtained by delaying the signal (Va) by a 1H delay circuit (44) by an adder (46) and a ½ multiplication circuit (48). On the basis of the rectangular-wave signal (Vc), a voltage signal (V3) is produced by an LPF (52) having a relatively small time constant, which is compared with a reference voltage (Vref) by a level-comparator (54), whereby a signal is outputted. The signal is used as a color killer signal for a color killer circuit, for example.

12 Claims, 20 Drawing Sheets

F I G. 4
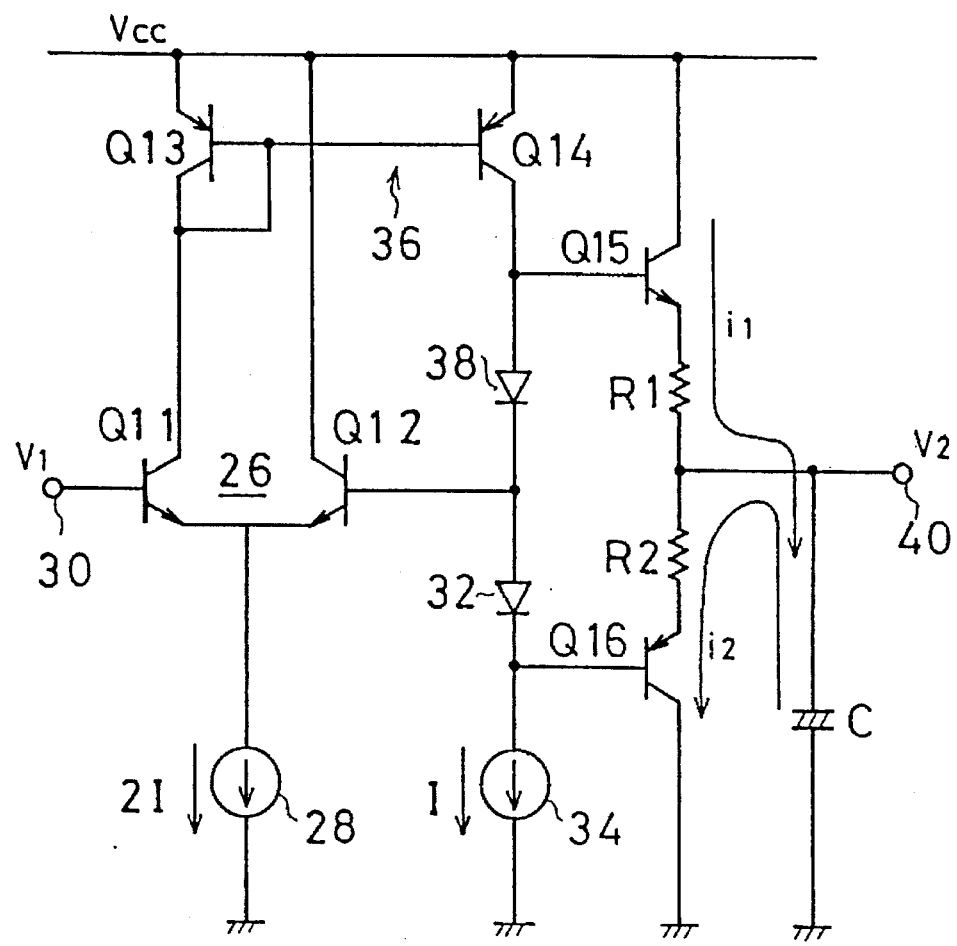
F I G. 5
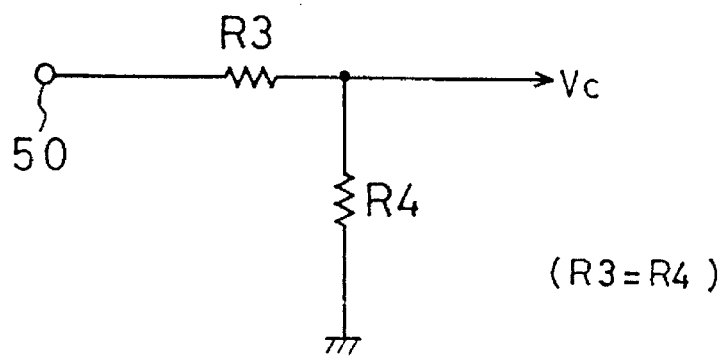
(R3=R4)

F I G. 7
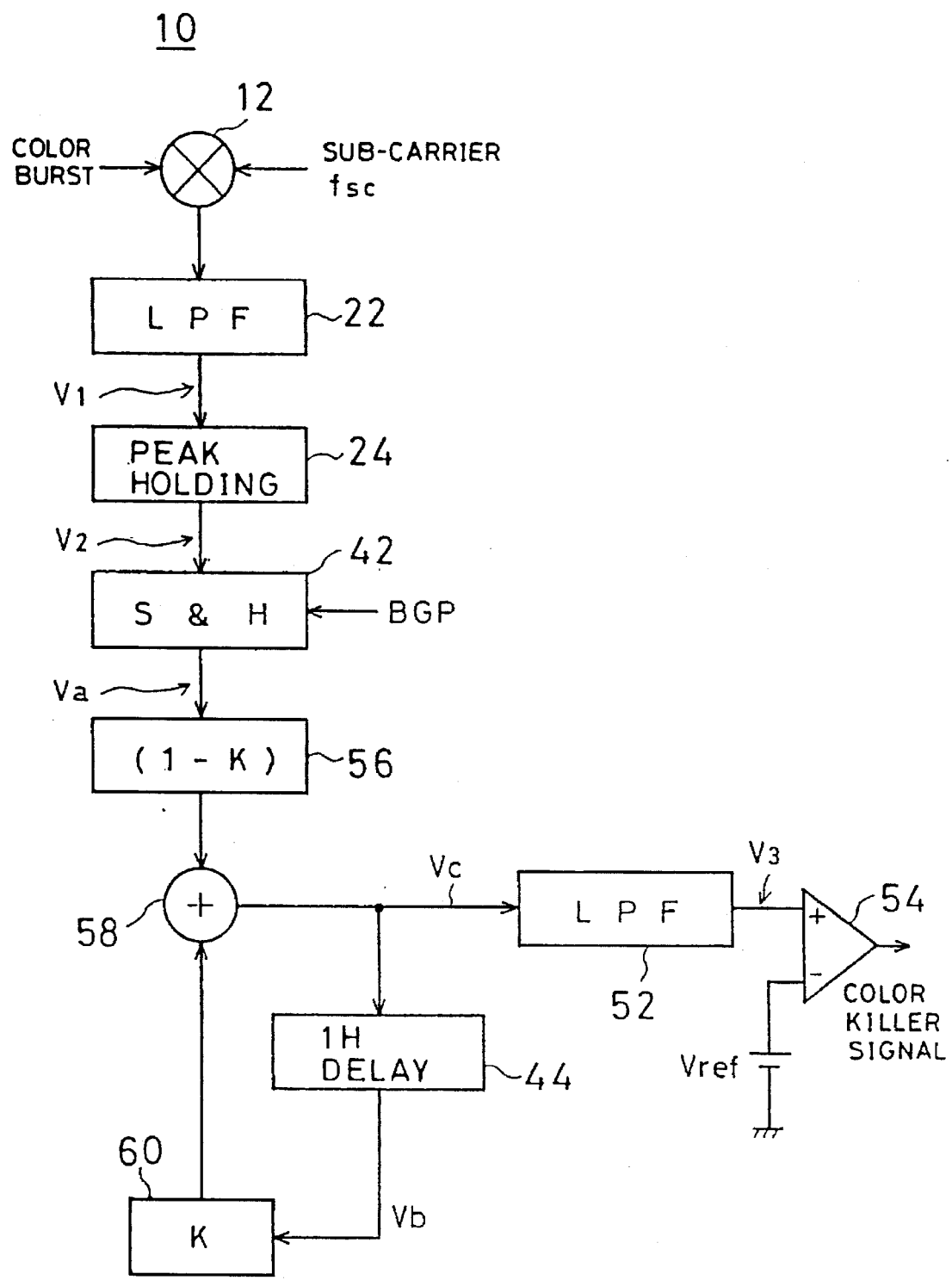

FIG.10(A) $e_1$
FIG.10(B) $e_2$
FIG.10(C) $e_3$
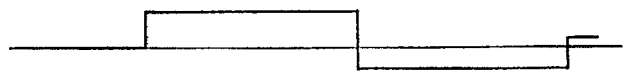
FIG.10(D) $e_4$
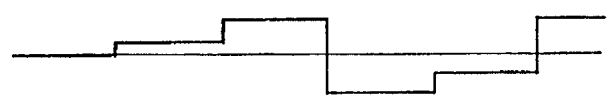
FIG.10(E) BGP
FIG.10(F) CNT1
FIG.10(G) CNT2
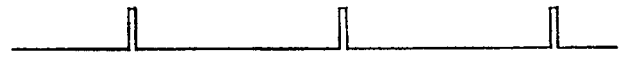
FIG.10(H) CNT3
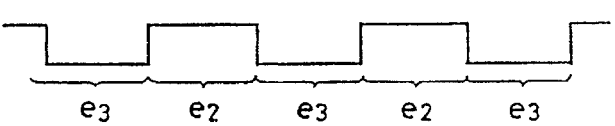

F I G. 11
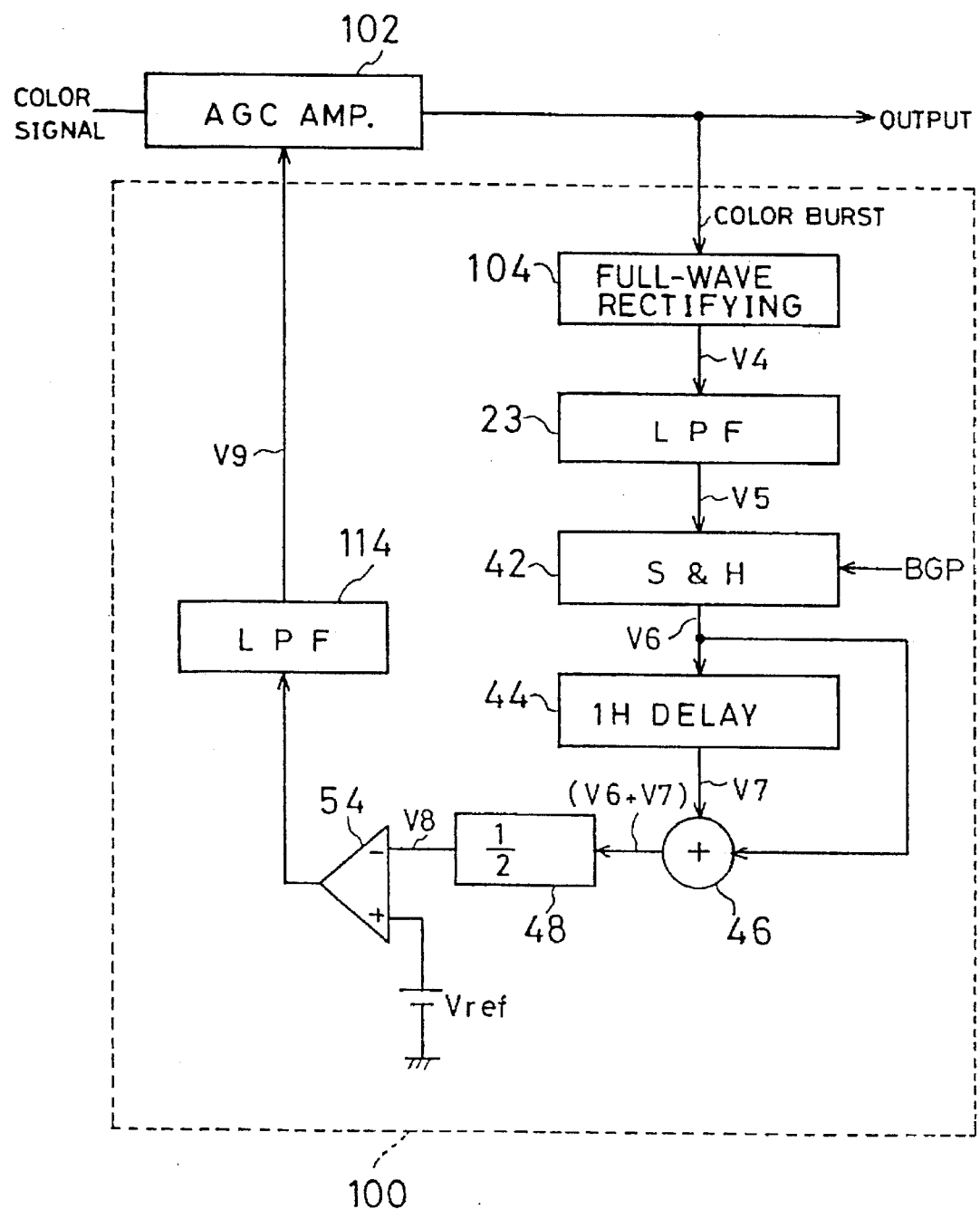

COLOR BURST

VB

VOLTAGE AT C

VOLTAGE AT D

RECTIFIED VOLTAGE SIGNAL V4

VOLTAGE SIGNAL V5

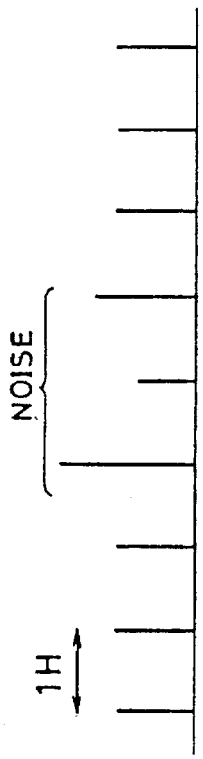
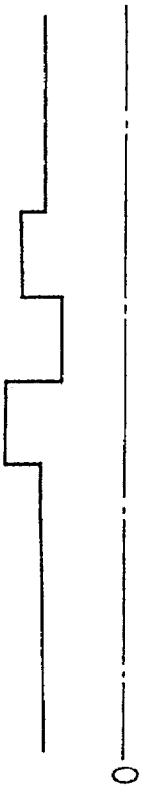
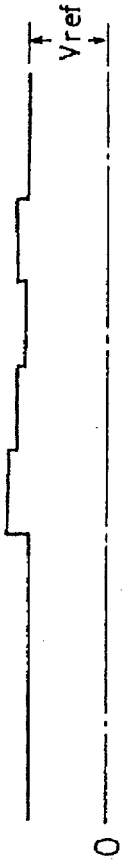
FIG. 14(A) v5
FIG. 14(B) v6
FIG. 14(C) v7
FIG. 14(D) v8
FIG. 14(E) GAIN ADJUSTMENT SIGNAL v9

V6

0

V9

0

F I G. 16
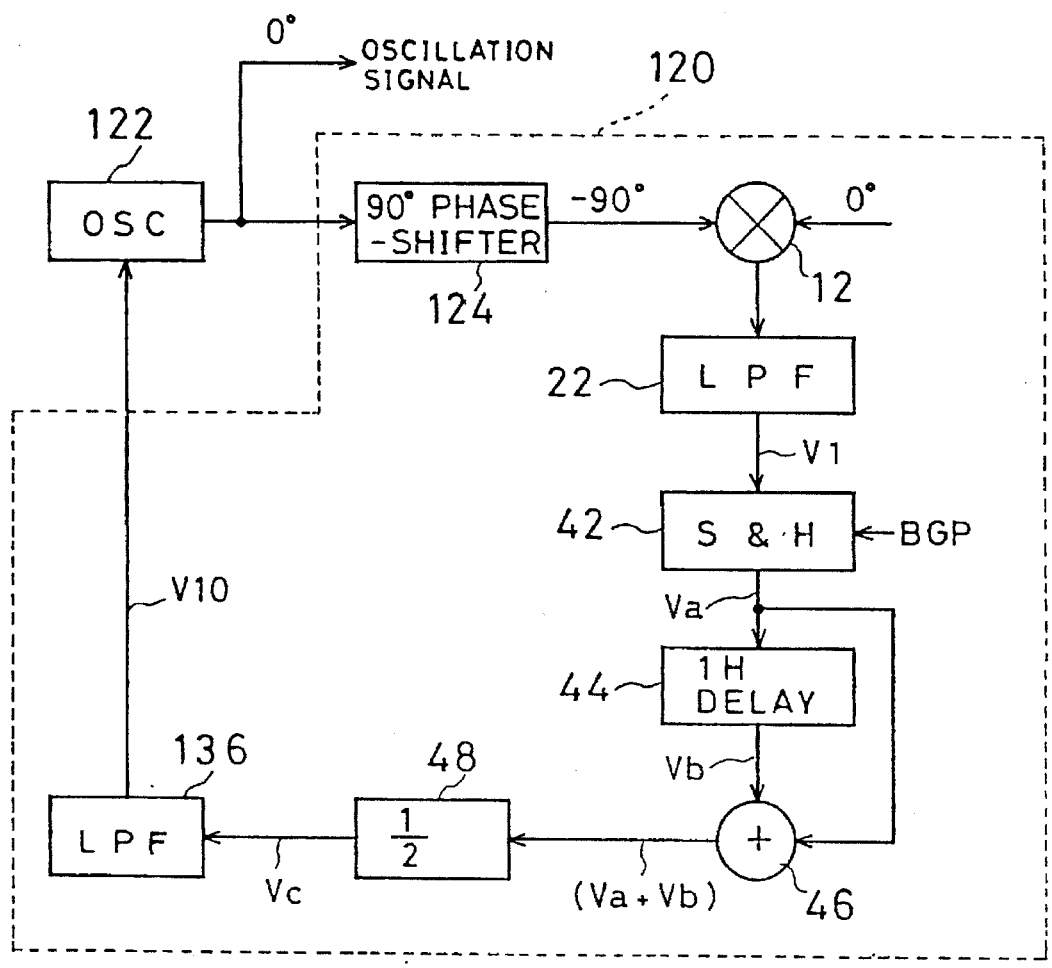

FIG. 17

COMPOSITE
VIDEO
SIGNAL

CARRIER
COLOR SIGNAL
+
COLOR BURST
SIGNAL

TELEVISION CIRCUIT UTILIZING COLOR BURST SIGNAL

BACKGROUND OF THE INVENTION

1. Field of the Invention

The present invention relates to a television circuit utilizing a color burst signal. More specifically, the present invention relates to a television circuit which utilizes a color burst signal and is used in a color killer circuit, an ACC circuit, an APC circuit, and a color reproducing circuit or a television receiver which is provided with the circuits therein.

2. Description of the Prior Art

With referring to FIG. 20, in a conventional color killer circuit 1, a color burst signal and a sub-carrier signal are inputted to a multiplier 2, whereby an output according to the presence or absence of the color burst signal is applied to an LPF 3, and thus, a voltage signal V1 as shown in FIG. 21(A) is outputted for each horizontal line from the LPF 3. In addition, although such a voltage signal V1 has a time width, in FIG. 21(A), the same is illustrated as a line to simplify the illustration. This is also applied to FIG. 6(A) and FIG. 14(A).

A peak hold signal V2 shown in FIG. 21(B) is outputted from a peak holding circuit 4 to which the voltage signal V1 is applied, and a voltage signal V3 as shown in FIG. 21(C) is outputted from an LPF 5, whereby a color killer signal as shown in FIG. 21(D) can be outputted from a level-comparator 6. That is, in receiving a color television signal, the color killer signal of the high level is outputted as such, a color killer operation, is not performed. In receiving monochrome television signal, the color killer signal of the low level is outputted, and the color killer operation is performed.

In such a conventional color killer circuit 1, if a time constant of the LPF 5 is made small, there occurs an erroneous operation as follows: In a case where the voltage signal V1 is largely affected by a noise as shown in a period X in FIG. 21(A), the voltage signal V3 is also largely affected by the noise, and therefore, there occurs a period (a) (FIG. 21(C)) during which the voltage signal V3 becomes smaller than a reference voltage Vref in spite of a color television signal. Therefore, due to the influence of the noise, the color killer signal of the low level is outputted as shown in FIG. 21(D), and the color killer operation is erroneously performed.

On the other hand, if the time constant of the LPF 5 is made be large, since the peak hold signal V2 is more smoothed, and therefore, the voltage signal V3 is not made be small to a level that is lower than the reference voltage Vref; however, in a case where the television signal being received is changed from a color television signal to a monochrome television signal or vice versa, it takes a long time to switch the color killer signal, and therefore, there was a problem in that it is impossible to rapidly respond to the change of the television signal.

SUMMARY OF THE INVENTION

Therefore, a principal object of the present invention is to provide a television circuit utilizing color burst signal capable of operating with no erroneous operation.

Another object of the present invention is to provide a color killer circuit capable of rapidly responding to the change of the television signal, with no erroneous operation.

Another object of the present invention is to provide an ACC circuit capable of performing a gain adjustment properly.

Another object of the present invention is to provide an APC circuit capable of performing a phase adjustment properly.

Another object of the present invention is to provide a novel color reproducing circuit.

Another object of the present invention is to provide a novel television receiver or a television signal receiving system.

A television circuit utilizing a color burst signal according to the present invention comprises: first voltage signal outputting means for outputting a first voltage signal on the basis of the color burst signal; averaging means for averaging the first voltage signal; and signal detecting means for outputting a signal on the basis of an averaged output from the averaging means.

The first voltage signal outputting means outputs the first voltage signal on the basis of the color burst signal to the averaging means. In the averaging means, the averaged output is obtained by a simple mean method or a weighted mean method, and the signal can be obtained on the basis of the averaged output in the signal detecting means.

In a case where the circuit is used for a color killer circuit, the first voltage signal obtained in accordance with the presence or absence of the color burst signal is averaged by the averaging means, and a color killer signal is outputted from determinating means included in the signal detecting means. In a case of an ACC, the first voltage signal obtained in response to an amplitude of the color burst signal is averaged by the averaging means, and a gain adjustment signal is outputted from the signal detecting means. In a case where the circuit is utilized for an APC circuit, the first voltage signal obtained in accordance with a phase of the color burst signal is averaged by the averaging means, and a phase adjustment signal is outputted from the signal detecting means.

In addition, by utilizing such the color circuit, the ACC circuit and the APC circuit, a color reproducing circuit, a television receiver and etc. can be constructed.

In accordance with the present invention, since the first voltage signal is averaged by the averaging means, it is possible to obtain a television circuit which is not affected by a noise, and is thus resistant to a noise. For example, if the circuit is utilized for a color killer circuit, the color killer circuit is resistant to a noise and with no erroneous operation, and the color killer circuit can rapidly respond to the change of the television signal between the color television signal and the monochrome television signal. Furthermore, even if there is a noise, the ACC circuit can adjust again properly, and the APC circuit can adjust a phase properly.

Furthermore, the performance of a color reproducing circuit or a television receiver which is constructed by using such the color killer circuit, ACC circuit, APC circuit and etc. can be obtained.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a circuit diagram showing one example of a peak holding circuit;

FIG. 5 is a circuit diagram showing one example of a ½ multiplication circuit;

FIG. 7 is a block diagram showing a color killer circuit of another embodiment according to the present invention;

FIGS. 10A–H are wave-forms showing an operation of the 1H delay circuit;

FIG. 11 is a block diagram showing an ACC circuit of another embodiment according to the present invention;

FIGS. 14A–E are wave-forms showing an operation of FIG. 11 ACC circuit in a case where a signal which is applied to the same includes a noise;

FIG. 16 is a block diagram showing an APC circuit of another embodiment according to the present invention;

FIG. 17 is a circuit-diagram showing one example of a 90° phase-shifter used in FIG. 16 embodiment;

DETAILED DESCRIPTION OF THE PREFERRED EMBODIMENTS

Figure 1:
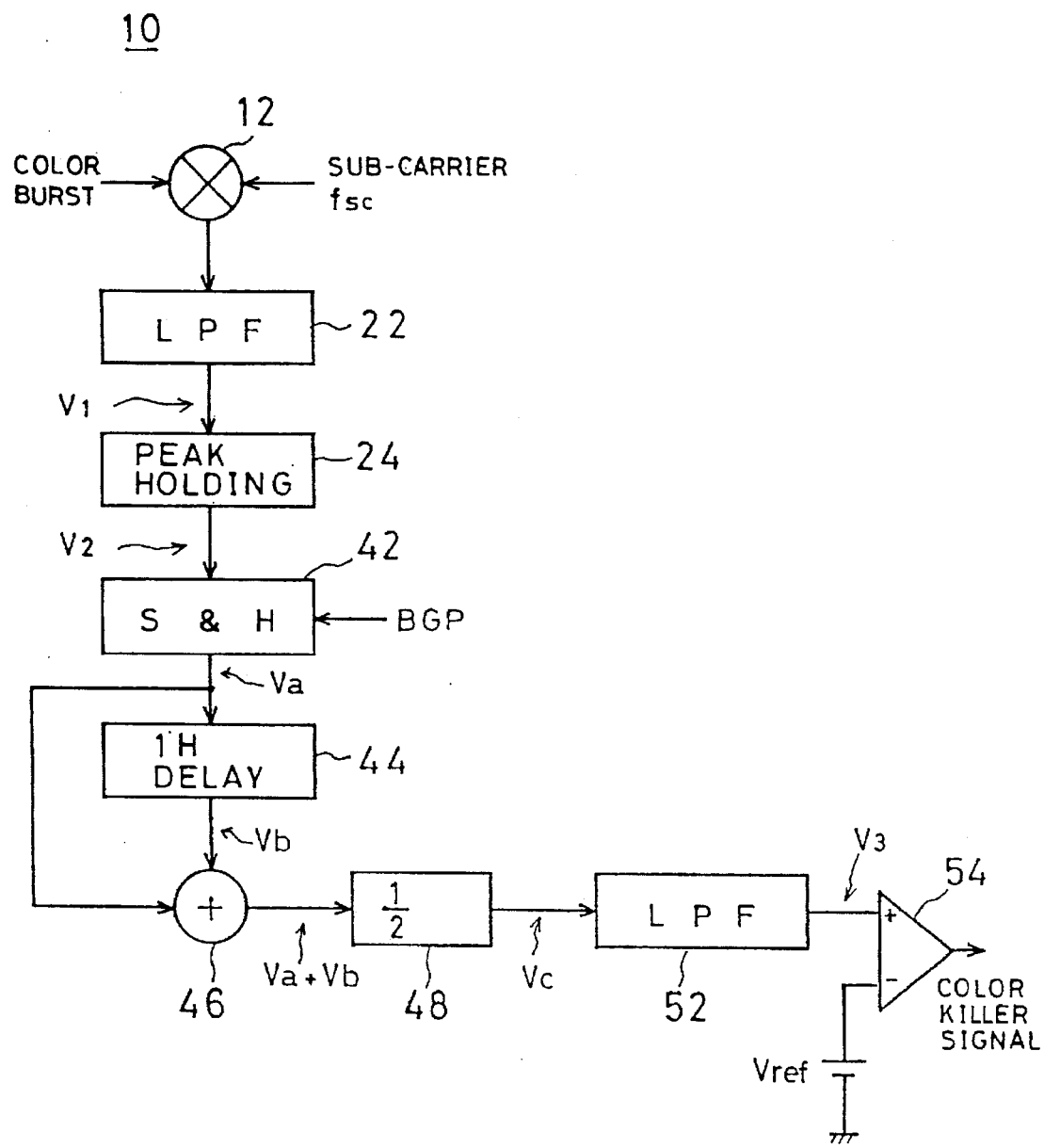
FIG. 1 is a block diagram showing a color killer circuit which is one embodiment according to the present invention.

Referring to FIG. 1, a color killer circuit 10 of this embodiment shown includes a multiplier 12 to which a color burst signal and a sub-carrier signal fsc. In receiving a color television signal, the color burst signal is applied to the multiplier 12. However, in receiving a monochrome television signal, no color burst signal is applied to the multiplier 12. The color burst signal and the sub-carrier signal fsc are applied to the multiplier 12 in such a manner that the both become in-phase or anti-phase, and an output from the multiplier 12 has a positive level in a case where the two inputs are anti-phase, or a negative level in a case of the two inputs are in-phase (see FIG. 3). In the embodiment shown, the phases of the color burst signal and the sub-carrier signal which are to be inputted to the multiplier 12 in receiving the color television signal are locked in a manner that the both become to be anti-phase. Therefore, in receiving the color television signal, the output from the multiplier 12 becomes a positive level.

Figure 2:
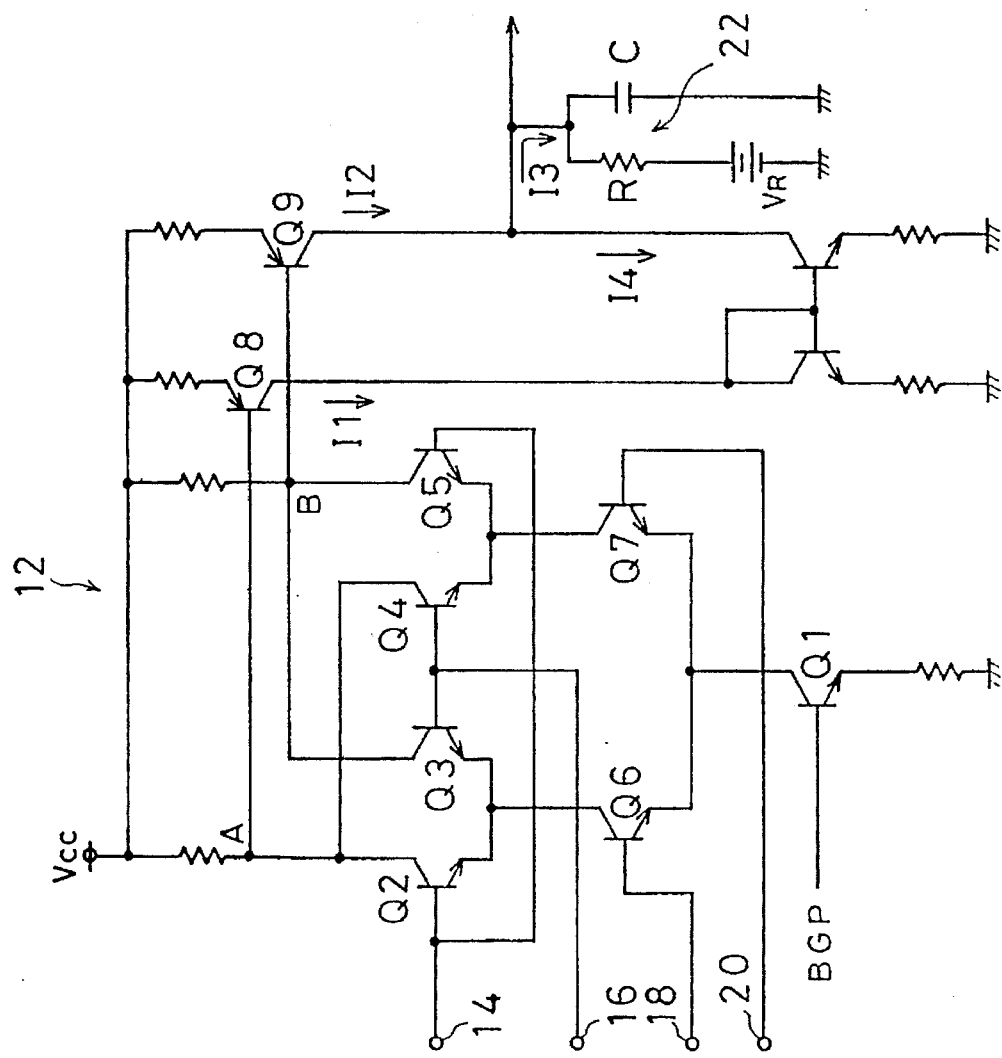
FIG. 2 is a circuit diagram showing one example of a multiplier in FIG. 1 embodiment.
Figure 3:
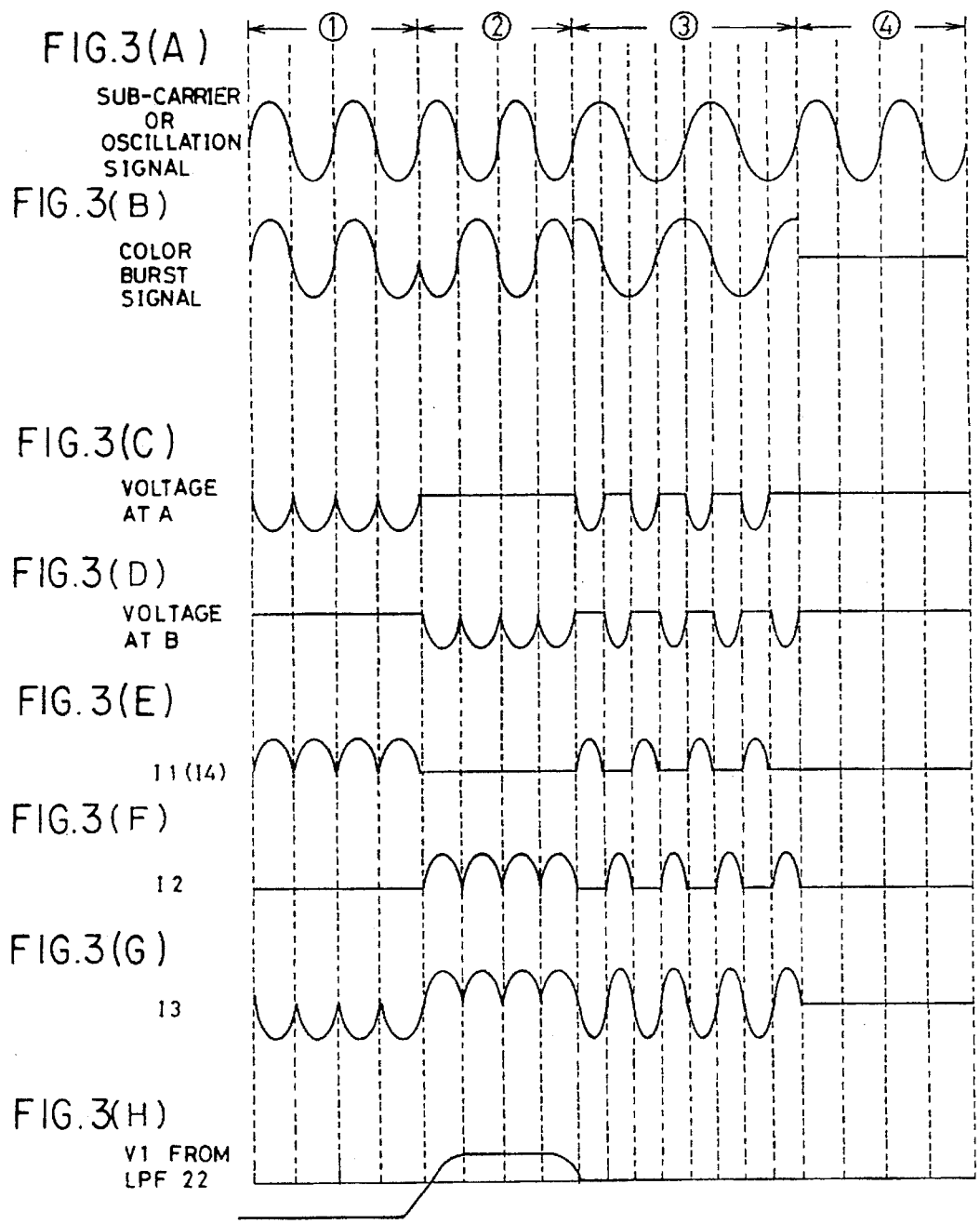
FIGS. 3A–H are wave-forms showing an operation of the multiplier shown in FIG. 2.

The multiplier 12 and an LPF 22 are constructed as shown in FIG. 2, and operate as shown in FIG. 3. The multiplier 12 is enabled in response to a fact that a burst gate pulse (BGP) is applied to a transistor Q1 during a burst gate period, and in the burst gate period, the sub-carrier signal fsc in FIG. 3(A) is inputted to input ends 14 and 16 shown in FIG. 2, and a color burst signal as shown in FIG. 3(B) is inputted to input ends 18 and 20.

In a case where the both signals are in-phase as shown in a period (1) of FIG. 3, transistors Q2 and Q6 are turned-on during a positive period of the sub-carrier signal fsc, and transistors Q4 and Q7 are turned-on during a negative period thereof. Therefore, a voltage at an output end A pulsates toward a negative direction at every half period as shown in FIG. 3(C), and a voltage at an output end B becomes zero as shown in FIG. 3(D). Accordingly, a current I1 (i.e., I4) flowing in a transistor Q8 pulsates toward a positive direction as shown in FIG. 3(E), and a current I2 flowing in a transistor Q9 becomes zero as shown in FIG. 3(F). Therefore, a current I3 (=I2–I4) flowing in the LPF 22 from the multiplier 12 pulsates toward a negative direction as shown in FIG. 3(G). The current I3 is smoothed or integrated by the LPF 22 which includes a resistor R and a capacitor C, and therefore, the LPF 22 outputs a negative voltage signal V1 as shown in FIG. 3(H) at a timing that the both signals are in-phase.

In a case the both signals are anti-phase as shown in a period (2) of FIG. 3, transistors Q5 and Q7 are turned-on during a positive period of the sub-carrier signal fsc, and transistors Q3 and Q6 are turned-on during a negative period of the sub-carrier signal. Therefore, a voltage at the output end A becomes zero as shown in FIG. 3(C), and a voltage at the output end B pulsates toward a negative direction at every half period as shown in FIG. 3(D). Accordingly, the current I1 (i.e., I4) flowing in the transistor Q8 becomes zero as shown in FIG. 3(E), and the current flowing in the transistor Q9 pulsates toward a positive direction as shown in FIG. 3(F). Therefore, the current I3 flowing into the LPF 22 from the multiplier 12 pulsates toward a positive direction as shown in FIG. 3(G). The current I3 is smoothed or integrated by the LPF 22, and therefore, the LPF 22 outputs a positive voltage signal V1 as shown in FIG. 3(H) at a timing that the both signals are anti-phase.

In a case where the sub-carrier signal is delayed in phase with respect to the color burst signal by 90 degrees as shown in a period (3) of FIG. 3, the transistors Q2 and Q6 are turned-on in a front half of a front half period of the sub-carrier signal as shown in FIG. 3(A), and the transistors Q4 and Q7 are turned-on in a rear half of the front half period of the sub-carrier signal. Therefore, a voltage at the output end A becomes a negative voltage in only the front halves of the respective half periods as shown in FIG. 3(C), and a voltage at the output end B appears as a negative voltage in the rear halves of the respective half periods as shown in FIG. 3(D). Accordingly, the current I1 (I4) flowing in the transistor Q8 flows toward a positive direction only the front halves of the respective half periods as shown in FIG. 3(E), and the current I2 flowing in the transistor Q9 flows toward a positive direction in only the rear halves of the respective half periods as shown in FIG. 3(F). Therefore, the current I3 flowing in the LPF 22 from the multiplier 12 becomes a sign-wave approximately as shown in FIG. 3(G). Accordingly, the LPF 22 outputs a voltage signal V1 having a level of VR (V) approximately at a timing that the sub-carrier signal fsc is delayed in phase by 90 degrees with respect to the color burst signal.

In a case of a period (4) of FIG. 3, the sub-carrier signal is inputted to the input ends 14 and 16 as shown in FIG.

3(A). However, since no color burst signal is inputted to the input ends 18 and 20 (i.e., a voltage at the input ends 18 and 20 becomes zero as shown in FIG. 3(B)), voltages at output ends A and B becomes zero, respectively, as shown in FIG. 3(C) and FIG. 3(D). Therefore, as shown in FIG. 3(E), FIG. 3(F) and FIG. 3(G), the currents I1 (I4), I2 and I3 also become zero. Therefore, the LPF 22 outputs a voltage signal of VR (V) as shown in FIG. 3(H).

Then, a case where the both signals are anti-phase as shown in the period (2) of FIG. 3 is corresponding to a state where the color television signal is received, and a case of the period (4) of FIG. 3 corresponding to a state where the monochrome television signal is received. Therefore, the LPF 22 outputs a positive voltage signal V1 in receiving the color television signal, and a voltage signal V1 of zero in receiving the monochrome television signal. Thus, the voltage signal V1 outputted from the LPF 22 becomes to be different s in accordance with a time that the color television signal is received or that the monochrome television signal is received.

Then, the voltage signal V1 is applied to a peak holding circuit 24 which is constructed as shown in FIG. 4.

The peak holding circuit 24 shown in FIG. 4 includes a differential pair 26 composed of transistors Q11 and Q12. Emitters of the transistors Q11 and Q12 are commonly connected to the ground via a constant current source 28 of a current 2I. The voltage signal V1 is inputted to a base of the transistor Q11 from an input terminal 30, and a base of the transistor Q12 is connected to the ground through a series connection of a diode 32 and a constant current source 34 of a current I. Furthermore, a collector of a transistor Q3 is connected to the collector of the transistor Q11, and a base of a transistor Q14 is connected to a base of the transistor Q13, and the collector and the base of the transistor Q13 are connected to each other. That is, the transistors Q13 and Q14 constitute a current mirror circuit 36.

A diode 38 is connected between a collector of the transistor Q14 and the base of the transistor Q12, and a base of a transistor Q15 is connected to the collector of the transistor Q14 and to an emitter of the transistor Q15, an emitter of a transistor Q16 having a collector which is connected to the ground is connected through a series connection of resistors R1 and R2. Furthermore, a base of the transistor Q16 is connected to a cathode of the diode 32, and a capacitor C1 having one end which is connected to the ground is connected to a connection point of the resistors R1 and R2, and a voltage at other end of the capacitor C1 is outputted as a peak hold signal V2 from an output terminal 40. In addition, the emitters of the transistors Q13 and Q14 and the collectors of the transistors Q12 and Q15 are connected to a power source voltage Vcc, respectively.

In the peak holding circuit 24 thus constructed, when the voltage signal V1 is inputted to the input terminal 30, an output of the differential pair 26 is withdrawn via the transistors Q13, Q14 and Q15 and the resistor R1, whereby the capacitor C1 is charged by a charging current I1. Then, if it becomes a state where no voltage signal V1 is inputted to the input terminal 30, the capacitor C1 is discharged, and therefore, a discharging current I2 flows. If a charging time constant τ1=R1·C1 is small and a discharging time constant τ2=R2·C1 is sufficiently larger than the charging time constant τ1, the voltage difference or potential difference of the capacitor C1 is outputted as the peak hold signal V2 from the output terminal 40.

The peak hold signal V2 from the peak holding circuit 24 is applied to a sampling/holding circuit 42 which samples and holds the peak hold signal V2 at a timing of a trailing edge, for example, of a burst gate pulse which is applied for each horizontal line. The sampling/holding circuit 42 thus holds a sampled value during one horizontal line period (1H) so as to produce a rectangular-wave signal Va. The rectangular-wave signal Va is applied to a 1H delay circuit 44 and an adder 46. The rectangular-wave signal Va becomes a rectangular-wave signal Vb by delaying by one horizontal line period (1H) by the 1H delay circuit 44 so as to be applied to the adder 46. The adder 46 applies a rectangular-wave signal (Va+Vb) obtained by adding the rectangular-wave signals Va and Vb to a ½ multiplication circuit 48. The ½ multiplication circuit 48 includes resistors R3 and R4 as shown in FIG. 5, for example, and the rectangular-wave signal (Va+Vb) inputted from an input terminal 50 is divided by the resistors R3 and R4, and therefore, a rectangular-wave signal Vc obtained by the ½ multiplication circuit 48. In addition, R3=R4. Furthermore, the rectangular-wave signal Vc is represented by the following equation (1).

$$Vc=(½)·(Va+Vb) \quad (1)$$

Thus, by performing an averaging the rectangular-wave signals Va and Vb of adjacent horizontal lines through a simple mean method, the rectangular-wave signal Vc is obtained, and the same is applied to an LPF 52. A time constant of the LPF 52 is set to be relatively small. A voltage signal V3 which is obtained by smoothing the rectangular-wave signal Vc by the LPF 52 is inputted to a (+) input of a level-comparator 54, and a reference voltage Vref is applied to a (−) input of the level-comparator 54. Therefore, the level-comparator 54 outputs a color killer signal of the high level or the low level according to comparison of the voltage signal V3 and the reference voltage Vref.

Thus, the television signal which is being received is determined according to whether or not the color burst signal is applied to the multiplier 12. Then, in receiving the color television signal, the color burst signal is applied to the multiplier 12, and therefore, the voltage signal V3 becomes larger than the reference voltage Vref (V3>Vref), and therefore, the color killer signal of the high level is outputted from the level comparator 54, so that no color killer operation is performed. On the other hand, in receiving the monochrome television signal, no color burst signal is applied to the multiplier 12, and therefore, the voltage signal V3 becomes smaller than the reference voltage Vref (V3<Vref), and therefore, the color killer signal of the low level is outputted from the level-comparator 54, so that a color killer operation is performed. That is, an operation of a bandpass amplifier 144 (FIG. 18) can be controlled.

Figure 21A:
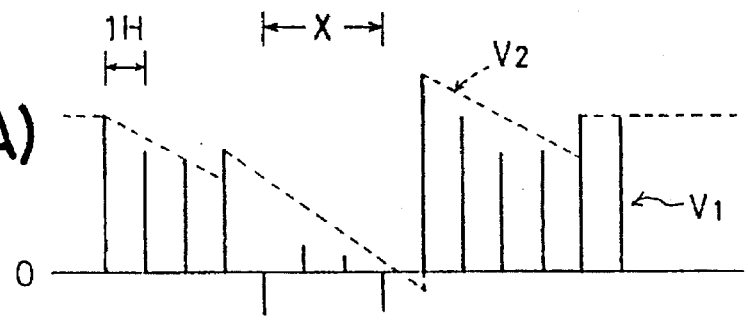
FIGS. 21A–D are wave-forms showing an operation of FIG. 20 prior art.
Figure 21B:
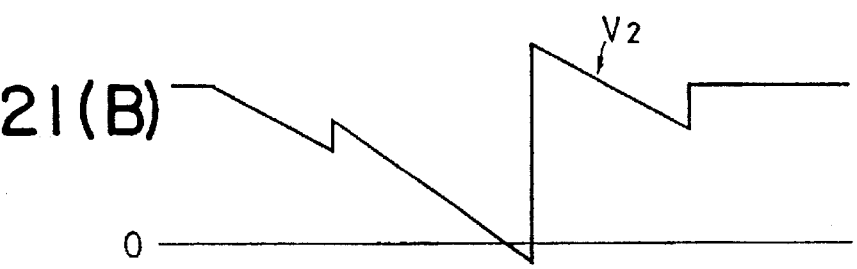
Figure 21C:
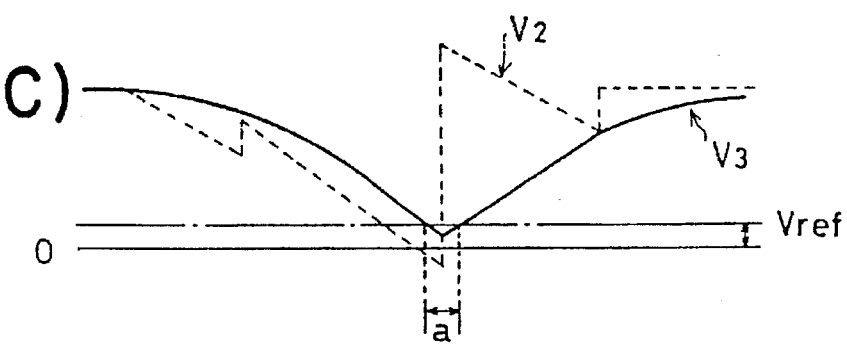
Figure 21D:
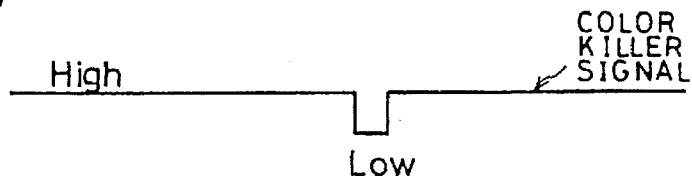

In the following, an operation of the color killer circuit 10 will be described with reference to FIG. 6. FIG. 6 shows a case where a color television signal includes a noise. In addition, in order to make the comparison with the prior art easily, the voltage signal V1 shown in FIG. 6(A) is illustrated to be equal to the voltage signal V1 of the prior art shown in FIG. 21(A).

Figure 6A:
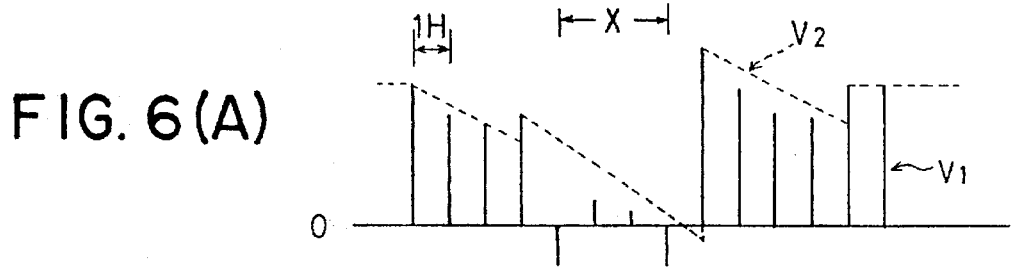
FIGS. 6A–F are wave-forms showing an operation of FIG. 1 embodiment.

First, when the color burst signal and the sub-carrier signal fsc are inputted to the multiplier 12, the voltage signal V1 shown in FIG. 6(A) is outputted from the LPF 22 on the basis of the output of the multiplier 12.

Figure 6B:
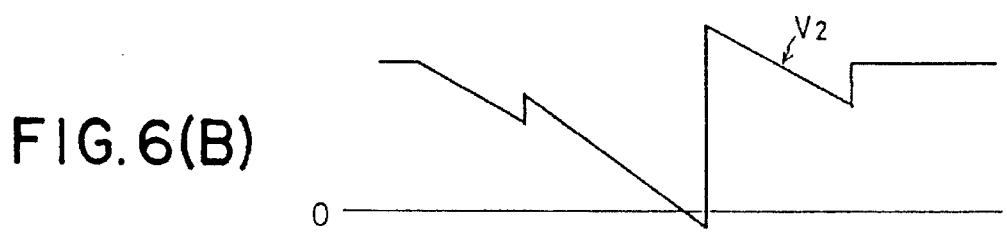
Figure 6C:
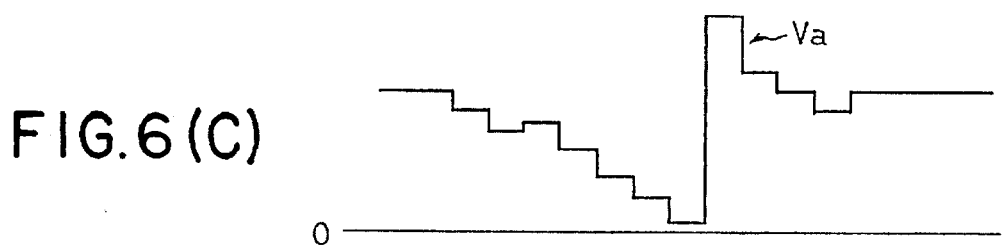
Figure 6D:
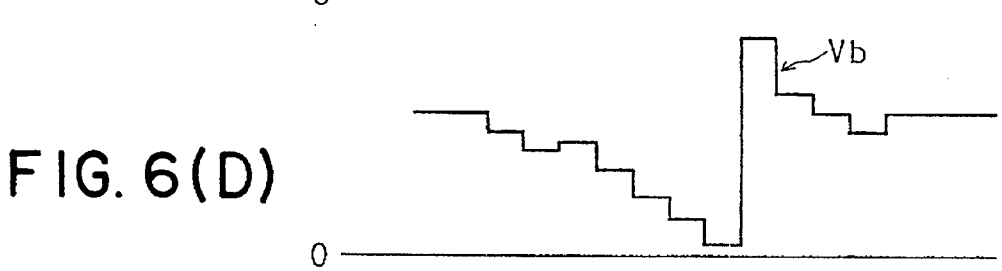

Then, the peak hold signal V2 shown in FIG. 6(B) is outputted from the peak holding circuit 24. The sampling/holding circuit 42 samples and holds the peak hold signal V2 at the timing of the trailing edge, for example, of the burst gate pulse which is applied for each horizontal line, and therefore, the rectangular-wave signal Va shown in FIG.

Figure 6E:
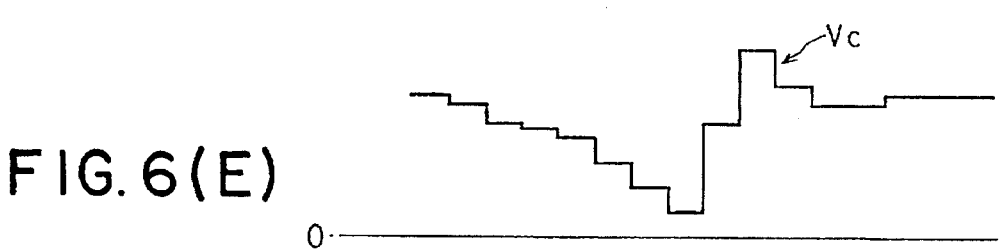
Figure 6F:
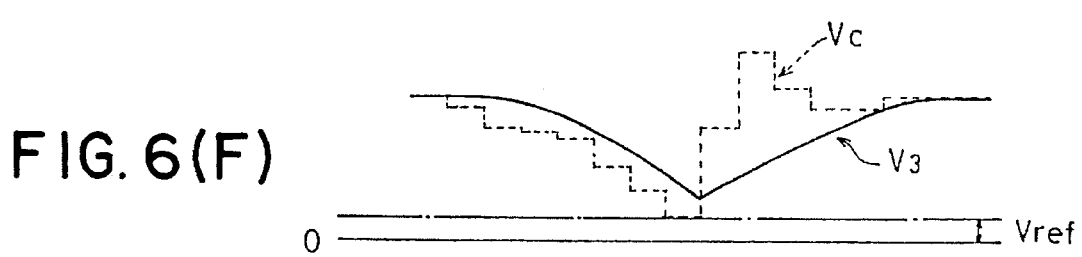

6(C) is generated by the sampling/holding circuit 42. The rectangular-wave signal Vb is obtained by the 1H delay circuit 44, and the rectangular-waves Va and Vb are added to each other by the adder 46, and thereafter, the rectangular-wave signal Vc shown in FIG. 6(E) is produced by the ½ multiplication circuit 48. The rectangular-wave signal Vc is smoothed by the LPF 52, and therefore, the voltage signal V3 shown in FIG. 6(F) is obtained to be applied to the level-comparator 54.

Since the rectangular-wave signal Vc is obtained by averaging the rectangular-wave signals Va and Vb, a sudden change in the rectangular-wave signal Va due to a noise can be absorbed, and therefore, the voltage signal V3 is not affected by the noise. In the level-comparator 54, the voltage signal V3 and the reference voltage Vref are compared with each other. As seen from FIG. 6(F), even if a noise is included in the color television signal, the color killer signal of the high level can be normally outputted from the level-comparator 54, and therefore, no color killer operation is performed. More specifically, in the prior art, if there is the period X in which the influence due to the noise is large, the color killer signal of the low level is erroneously outputted from the level-comparator 54, and therefore, a color killer operation is erroneously performed. However, in accordance with the color killer circuit 10 of this embodiment shown, even if there is the period X (shown in FIG. 6(A)) in which the influence due to the noise is large, the voltage signal V3 does not become to be smaller than the reference voltage Vref, and therefore, the color killer signal of the high level is continuously outputted from the level-comparator 54, and therefore, the color killer operation can be prevented from being erroneously performed.

Furthermore, since it is possible to set the time constant of the LPF 52 to be relatively small, even if the television signal being received is changed from the color television signal to the monochrome television signal or vice versa, it is possible to rapidly change the level of the color killer signal from the color killer circuit 10, and therefore, it is possible to rapidly respond to the change of the television signal which is being received.

According to the embodiment shown, since the peak hold signal V2 is sampled and held and averaged, even if the time constant of the LPF 52 which is the smoothing means is set to be relatively small, the voltage signal V3 from the LPF 52 is hardly effected by the influence due to the noise, and therefore, it is possible to obtain a color killer circuit which is resistant to a noise. At the same time, since the time constant of the LPF 52 may be set to be relatively small, it is possible to rapidly respond to the change of the television signal between the color television signal and the monochrome television signal.

With reference to FIG. 7, in a color killer circuit 10 of another embodiment according to the present invention, the rectangular-wave signal from the sampling/holding circuit 42 is subjected to a waited mean method, and an averaged output is applied to the LPF 52. Therefore, instead of the 1H delay circuit 44, the adder 46 and the ½ multiplication circuit 48 of the color killer circuit 10 shown in FIG. 1, a 1H delay circuit 44, a (1–K) multiplication circuit 56, an adder 58 and a K multiplication circuit 60 are utilized in this embodiment shown.

Figure 8:
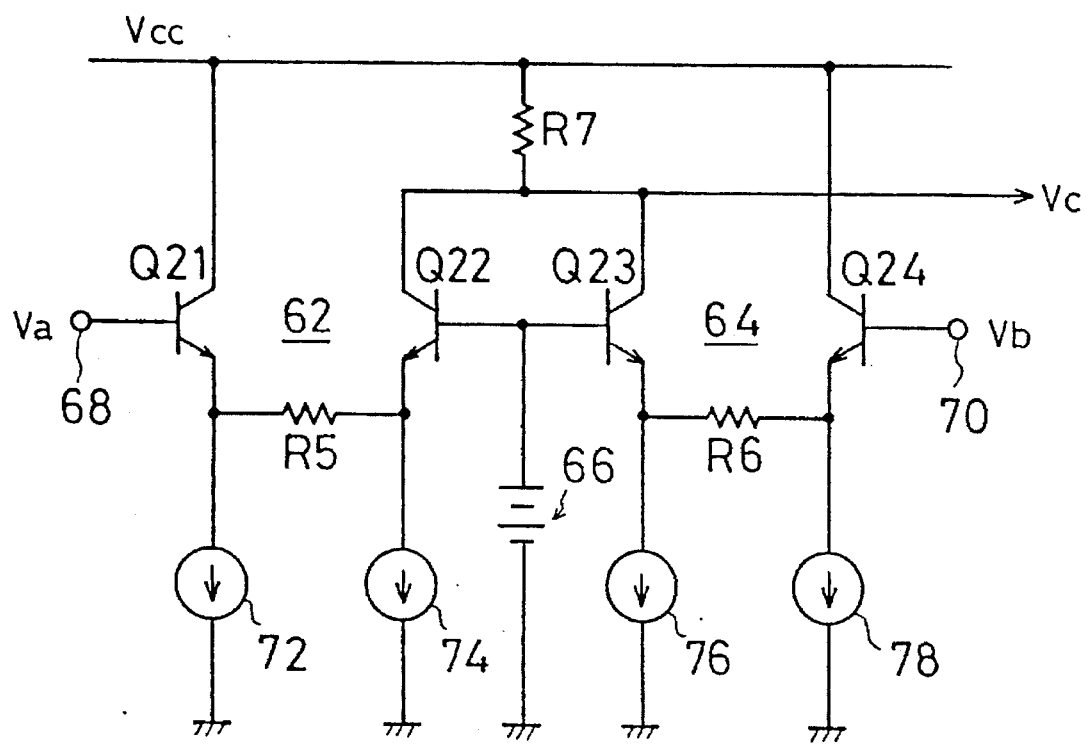
FIG. 8 is a circuit diagram showing a circuit for performing a weighted mean, being used in FIG. 7 embodiment.

Circuits for constituting the (1–K) multiplication circuit 58, the adder 58 and the K multiplication circuit 60 are constructed as shown in FIG. 8.

A circuit shown in FIG. 8 includes a differential pair 62 composed of transistors Q21 and Q22 and a differential pair 64 composed of transistors Q23 and Q24. Bases of the transistors Q22 and Q23 are connected to each other, and a direct current voltage 66 is applied to a connection point thereof. The rectangular-wave signal Va from the sampling/holding circuit 42 is applied to an input end 68 which is connected to the base of the transistor Q21, and the rectangular-wave signal Vb from the 1H delay circuit 44 is applied to an input end 70 which is connected to the base of the transistor Q24. Then, emitters of the transistors Q21 and Q22 are connected to each other via a resistor R5, and emitters of the transistors Q23 and Q24 are connected to each other through a resistor R6, and emitters of the transistors Q21, Q22, Q23 and Q24 are connected to the ground through constant current sources 72, 74, 76 and 78, respectively. Furthermore, collectors of the transistors Q22 and Q23 are connected to each other, and from a connection point thereof, a rectangular-wave signal Vc which is obtained by averaging the rectangular-wave signals Va and Vb through a waited mean method can be withdrawn. In addition, collectors of the transistors Q21–Q24 are commonly connected to the power source voltage Vcc via a resistor R7.

In the circuit constructed in the above described manner, on the assumption that R7/R5=1–K, and R7/R6=K, the rectangular-wave signal Vc can be represented by the following equation (2):

$$Vc=(R7/R5)Va+(R7/R6)Vb=(1-K)Va+KVb \tag{2}$$

As shown by the above described equation (2), the rectangular-wave signal Vc which is obtained by averaging the rectangular-wave signals Va and Vb by a waited mean method can be obtained.

Thus, by averaging the rectangular-wave signals of many horizontal lines through a waited mean method, it is possible to further reduce the influence of the noise.

Figure 9:
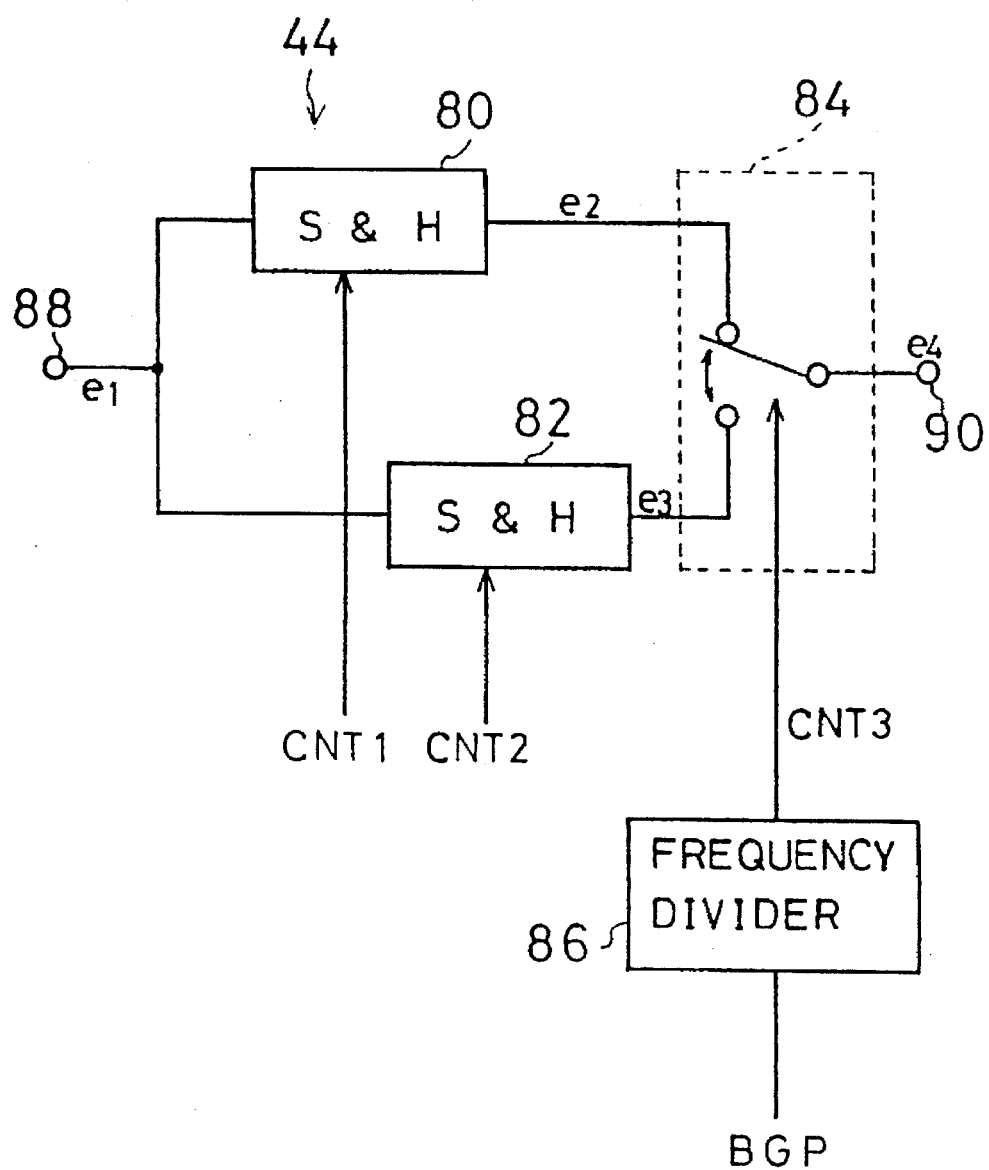
FIG. 9 is a block diagram showing on example of a 1H delay circuit.

In addition, the 1H delay circuit 44 utilized in the above described embodiments may be constructed by a CCD element, but preferably constructed as shown in FIG. 9. The 1H delay circuit 44 shown in FIG. 9 includes two sampling/holding circuits 80 and 82, and a multiplexer 84 which selects any one of the sampling/holding circuits 80 and 82. A control pulse CNT3 which has a rectangular-wave form and is obtained by ½ frequency dividing the burst gate pulse by a frequency divider 86 is applied to the multiplexer 84, whereby a selection operation of the multiplexer 84 can be controlled. Furthermore, to the sampling/holding circuits 80 and 82, control pulses CNT1 and CNT2 which are in synchronization with the burst gate pulse, respectively are applied at every two horizontal lines.

An operation of the 1H delay circuit 44 will be described with reference to FIG. 10. A rectangular-wave signal e1 is applied to the sampling/holding circuits 80 and 82, respectively from an input end 88. The control pulses CNT1 and CNT2 shown in FIG. 10(F) and FIG. 10(G) are respectively applied to the sampling/holding circuits 80 and 82 which respectively output rectangular-wave signals e2 and e3 shown in FIG. 10(B) and FIG. 10(C) in response to the control pulses CNT1 and CNT2. Then, the control pulse CNT3 shown in FIG. 10(H) is applied to the multiplexer 84. The selection operation of the multiplexer 84 is controlled by the control pulse CNT3, so that the multiplexer 84 selects the rectangular-wave signals e3 and e2 at every two horizontal lines, and therefore, a rectangular-wave signal e4 shown in FIG. 10(D) is outputted from an output end 90. It will be understood through the comparison of the rectangular-wave signals e1 and e4 shown in FIG. 10(A) and FIG. 10(D) that the rectangular-wave signal e4 is delayed by one horizontal line period (1H) with respect to the rectangular-wave signal e1.

Next, an ACC circuit 100 of another embodiment according to the present invention is shown in FIG. 10. The ACC circuit 100 is a circuit for adjusting a gain of an AGC amplifier 102 in response to an amplitude of a color burst signal from the AGC amplifier 102 which is included in the bandpass amplifier 144 (FIG. 8). In addition, in the AGC amplifier 102, the larger gain adjustment signal V9, the higher gain. To the AGC amplifier 102, a color signal which includes a carrier color signal and the color burst signal is applied, and the AGC circuit 100 includes a full-wave rectifying circuit 104 for full-wave rectifying the color burst signal.

Figure 12:
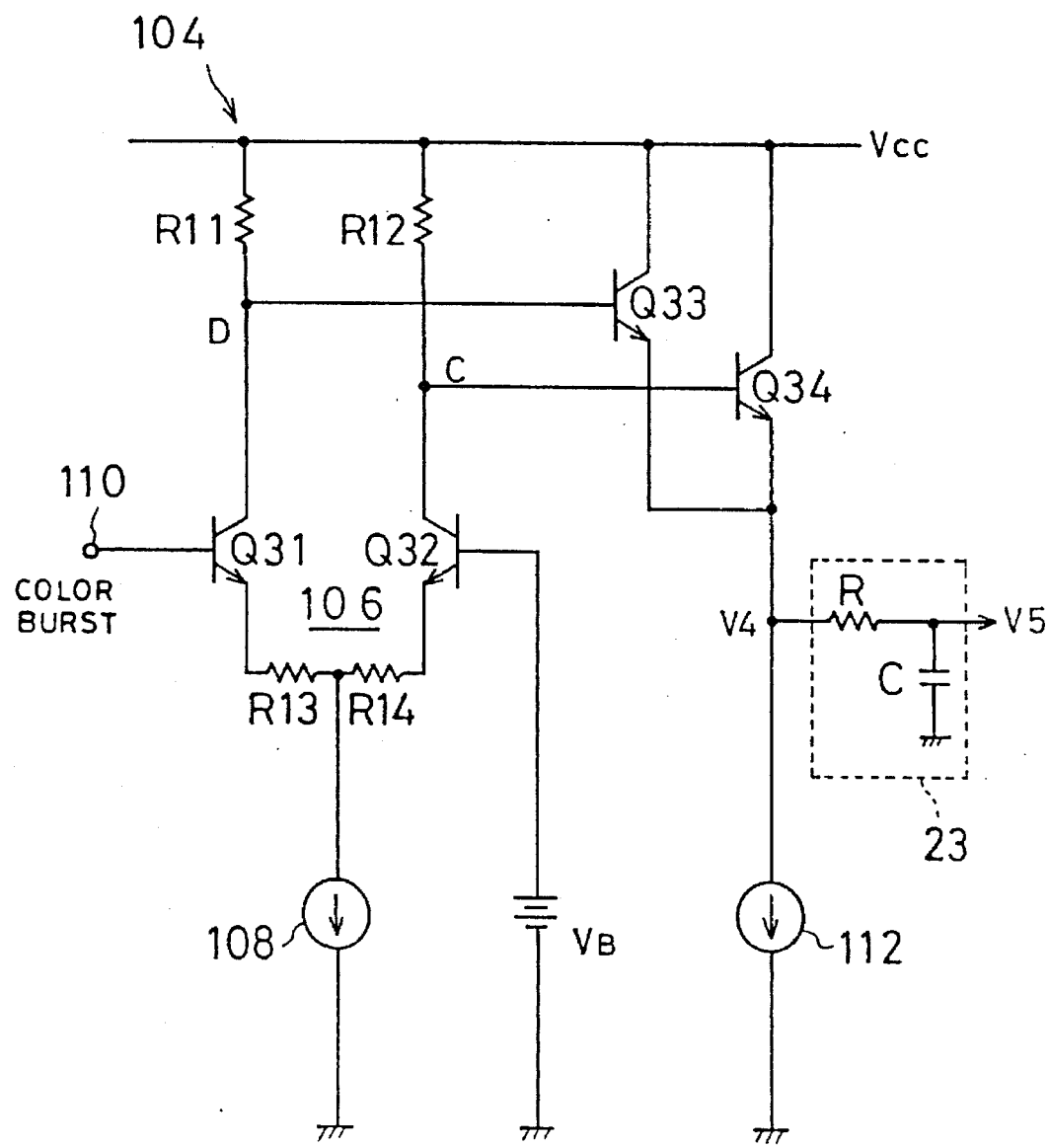
FIG. 12 is a circuit diagram showing a full-wave rectifying circuit used in FIG. 11 embodiment.
Figure 13A:
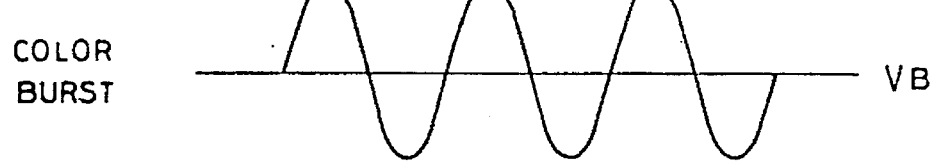
FIGS. 13A–E are wave-forms showing operations of the full-wave rectifying circuit and an LPF.
Figure 13B:
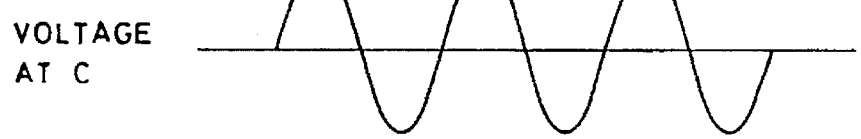
Figure 13C:
Figure 13D:
Figure 13E:

The full-wave rectifying circuit 104 is constructed as shown in FIG. 12, for example. The full-wave rectifying circuit 104 includes a differential pair 106 composed of transistors Q31 and Q32. Emitters of the transistors Q31 and Q32 are connected to each other through resistors R13 and R14, and connected to the ground through a constant current source 108. The color burst signal from an input terminal 110 is applied to a base of the transistor Q31, and a direct current power source voltage VB is applied to a base of the transistor Q32. Collectors of the transistors Q31 and Q32 are connected to a power source voltage Vcc through resistors R11 and R12, respectively. Furthermore, collector outputs of the transistors Q31 and Q32 are connected to bases of transistors Q33 and Q34, respectively. Collectors of the transistors Q33 and Q34 are connected to the power source voltage Vcc, and emitters of the transistors Q33 and Q34 are connected to each other, and an emitter output therefrom is applied to an LPF 23 which includes a resistor R and a capacitor C, for example, as a rectified voltage signal V4. Then, a voltage signal V5 is obtained. In addition, the emitters of the transistors Q33 and Q34 are connected to the ground through a constant current source 112.

In the color burst period, the full-wave rectifying circuit 104 operates as shown in FIG. 13. When the color burst signal shown in FIG. 13(A) is applied to the transistor Q31 from the input terminal 110, an output according to a voltage differences between the color burst signal and the direct current voltage VB are outputted from the output ends C and D as shown in FIG. 13(B) and FIG. 13(C). That is, a positive voltage is outputted at the output end C during a positive period of the color burst signal, and a positive voltage is outputted at the output end D during a negative period of the color burst signal. Then, the output from the output end C is applied to the LPF 23 via the transistor Q34, and the output of the output end D is applied to the LPF 23 via the transistor Q33. Therefore, the rectified voltage signal V4 shown in FIG. 13(D) is inputted to the LPF 23. In addition, the rectified voltage signal V4 is changed in accordance with a level or amplitude of the color burst signal. Then, the rectified voltage signal V4 is smoothed or integrated by the LPF 23, and therefore, the voltage signal V5 having a level according to the level of the burst color signal and being shown in FIG. 13(E) is outputted to the sampling/holding circuit 42.

Similiar to the case of the color killer circuit 10, the sampling/holding circuit 42 samples the voltage signal V5 shown in FIG. 14(A) at a timing of the trailing edge of the burst gate pulse which is applied for each horizontal line, and holds a sampled value during one horizontal line period (1H) to produce a rectangular-wave signal V6 shown in FIG. 14(B). The rectangular-wave signal V6 is applied to the 1H delay circuit 44 and the adder 46. The rectangular-wave signal V6 becomes a rectangular-wave signal V7 through the 1H delay circuit 44, which is applied to the adder 46. The adder 46 applies a rectangular-wave signal (V6+V7) obtained by adding the rectangular-wave signals V6 and V7 to the ½ multiplication circuit 48.

The ½ multiplication circuit 48 is constructed as shown in FIG. 5, for example, and therefore, a rectangular-wave signal V8 through the ½ multiplication circuit 48 can be obtained. The rectangular-wave signal V8 is applied to the (−) input of the level-comparator 54 so as to be compared with the reference voltage Vref which is applied to the (+) input of the level-comparator 54. The level-comparator 54 outputs a signal of the high level or the low level through the comparison of the rectangular-wave signal V8 and the reference voltage Vref which determines an ACC level. More specifically, if the rectangular-wave signal V8 is larger than the reference voltage Vref, the level-comparator 54 outputs a signal of the low level, and therefore, the gain adjustment voltage signal V9 from an LPF 114 becomes small, and therefore, a gain of the AGC amplifier 102 becomes small. On the other hand, if the rectangular-wave signal V8 is smaller than the reference voltage Vref, the level-comparator 54 outputs a signal of the high level, and therefore, the gain adjustment signal V9 from the LPF 114 becomes larger and the gain of the AGC amplifier 102 becomes higher.

Figure 15A:
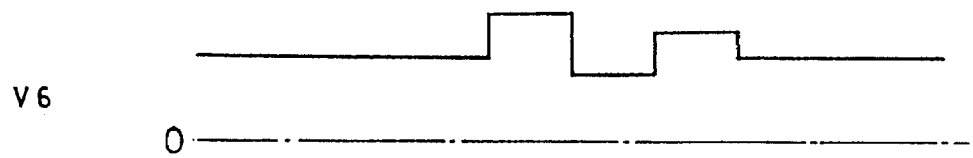
FIGS. 15A–B are wave-forms showing an operation of a prior art ACC circuit in a case where a signal which is applied to the same includes a noise.

In the ACC circuit 100 having the above described structure, by applying the rectangular-wave signal V8 which is obtained by averaging the rectangular-wave signals V6 and V7 to the level-comparator 54, the gain adjustment signal V9 from the LPF 114 becomes as shown in FIG. 14(E). As seen from FIG. 14(E), if there is a noise, as shown in FIG. 14(A), the gain adjustment signal V9 is hardly varied with respect to a control voltage level which is originally to be set for the AGC amplifier 102. On the other hand, ACC circuit of the prior art is constructed by deleting the 1H delay circuit 44, the adder 46 and the ½ multiplication circuit 48 from the ACC circuit 100 shown in FIG. 11. Therefore, in the prior art ACC circuit, the rectangular-wave signal V6 from the sampling/holding circuit 46 is directly applied to the (−) input of the level-comparator 54 as shown in FIG. 15(A), the gain adjustment signal V9 from the LPF 114 is largely affected by the noise as shown in FIG. 15(B).

Figure 15B:
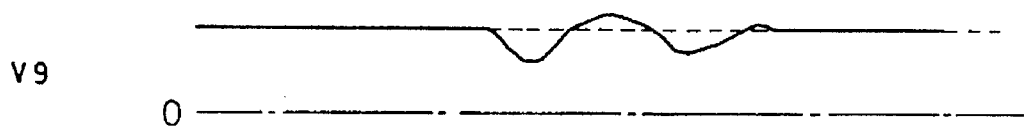

As seen through the comparison of FIG. 14(E) and FIG. 15(B), in the ACC circuit 100 of this embodiment shown in FIG. 11, even if a large noise is applied, the variation of the gain adjustment signal V9 becomes smaller than that of the prior art, and therefore, the influence of the noise can be reduced. That is, in the ACC circuit 100, even if a receiving condition is bad as such that an electric field is weak or that a noise is erroneously determined as the color burst signal, the gain of the AGC amplifier 102 can be stably adjusted, and therefore, it is possible to prevent an erroneous operation.

Next, an APC circuit 120 of another embodiment according to the present invention is shown in FIG. 16. The APC circuit 120 is a circuit for adjusting a frequency phase of an oscillation signal outputted from an oscillator 122 which is a VXO (voltage-controlled crystal oscillator), for example. The APC circuit 120 includes a 90° phase-shifter 124. The 90° phase-shifter 124 delays the oscillation signal from the oscillator 122 by 90 degrees so as to apply the same to the multiplier 12. The 90° phase-shifter 124 is constructed as shown in FIG. 17, for example.

Figure 17:
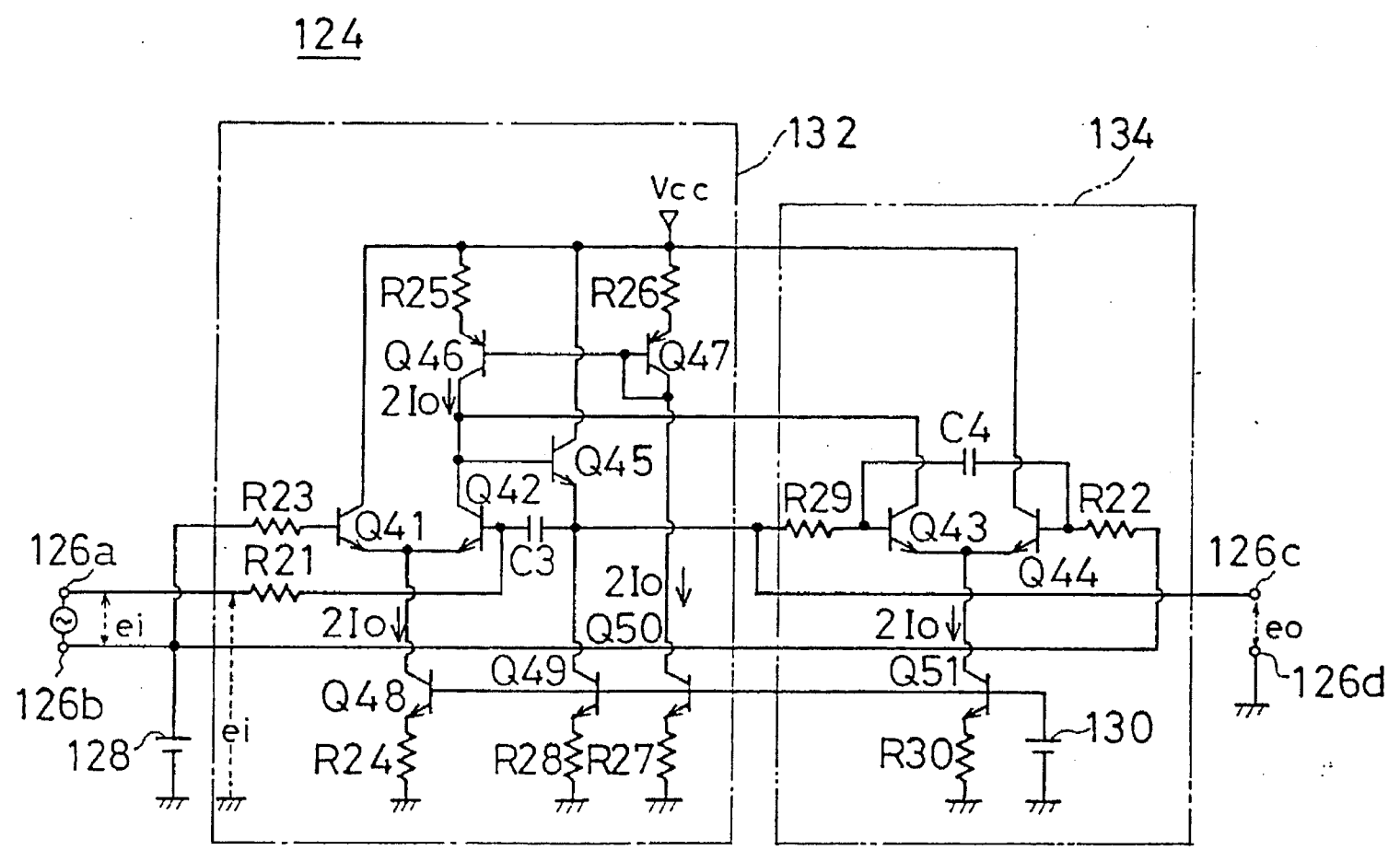

In the 90° phase-shifter 124 shown in FIG. 17, an input end 126a is connected to a base of a transistor Q42 of transistors Q41 and Q42 which are connected to each other in a differential manner, via a resistor R21. An input end 128b is connected to a (+) terminal of a constant voltage source 128 having a (−) terminal which is connected to the ground, and the input end 126b is further connected to a base of a transistor Q44 of transistors Q43 and Q44 which are connected to each other in a differential manner, via a resistor R22, and further to a base of the transistor Q41 via a resistor R23. Emitters of the transistors Q41 and Q42 are commonly connected to the ground via a series circuit of a transistor Q48 and a resistor R24. A collector of the transistor Q41 is directly connected to a voltage source Vcc, and a collector of the transistor Q42 is connected to the voltage source Vcc via a series circuit of a transistor Q46 and a resistor R25. A connection point of the collector of the transistor Q42 and a collector of the transistor Q46 is connected to a base of the transistor Q45 and a collector of the transistor Q43.

A base of the transistor Q46 is connected to a base and a collector of a transistor Q47, and an emitter of the transistor Q47 is connected to the voltage source Vcc via a resistor R26. These transistors Q46 and Q47 constitute a current mirror circuit. The collector of the transistor Q47 is connected to the ground via a series circuit of a transistor Q50 and a resistor R27. The collector of the transistor Q45 is directly connected to the voltage source Vcc and an emitter thereof is connected to the ground through a series circuit of a transistor Q49 and a resistor R28.

The base of the transistor Q42 is connected to the base of the transistor Q43 via a series circuit of a capacitor C3 and a resistor R29. A connection point of the capacitor C3 and the resistor R29 is connected to an output end 126c. An output end 126d is connected to the ground. A capacitor C4 is inserted between the base of the transistor Q43 and the base of the transistor Q44, and emitters thereof are commonly connected to the ground through a series circuit of a transistor Q51 and a resistor R30. Bases of the transistors Q48, Q49, Q50 and Q51 are commonly connected to a (+) terminal of a constant voltage source 130 having a (−) terminal which is connected to the ground. That is, the 90° phase-shifter 124 includes an alternating current negative feed-back amplifier 132 including the transistors Q41, Q42, Q45, Q46, Q47, Q48, Q49 and Q50, and the resistor R21, the capacitor C3 and etc. which constitute a high-pass filter, and surrounded by a one-dotted line in FIG. 17, and further having a direct current negative feed-back circuit 134 including the resistors R29 and R22 and the capacitor C4 which constitute a low-pass filter, and the transistors Q43 and Q44, and etc., and surrounded by a two-dotted line in FIG. 17, the negative feed-back circuit 134 feeding a direct current voltage back to the negative feed-back amplifier 132.

In addition, the transistors Q48, Q49, Q50 and Q51 constitute a constant current source, and the resistors R24, R27 and R30 have the same resistance value. Therefore, collector currents of the transistors Q48, Q50 and Q51 are equal to each other, and therefore, if a current value of the collector current is 2Io, the collector current of the transistor Q46 becomes 2Io if the resistance values of the resistors R25 and R26 are the same resistance value because the transistors Q46 and Q47 constitute a current mirror circuit.

Next, an operation in an alternating current of the 90° phase-shifter 124 will be described. The base of the transistor Q41 is connected to the ground in an alternating current. The transistor Q46 functions as a load for withdrawing an output of the differential transistors Q41 and Q42 in a form of a current, and an alternating current load becomes a very large value, and therefore, an open loop gain A is sufficiently large. If the collector current of the transistor Q42 is changed, the base current of the transistor Q45 is also changed, whereby the output is withdrawn as a voltage by an emitter-follower of the transistor Q45. The output voltage eo outputted from the emitter-follower of the transistor Q45 is supplied to the high-pass filter composed of the capacitor C3 and the resistor R21. Therefore, the base voltage of the transistor Q42 is given by the following equation (3).

$$ei = \frac{1}{j\omega C3 \cdot R21 + 1} + e_o \frac{j\omega C3 \cdot R21}{j\omega C3 \cdot R21 + 1} \quad (3)$$

Then, the base voltage of the transistor Q41 is connected to the ground in an alternating current, the relationship between the input voltage ei and the output voltage eo is given by the following equation (4).

$$e_o = \left\{ 0 - \left[ e_i \frac{1}{j\omega C3 \cdot R21 + 1} + e_o \frac{j\omega C3 \cdot R21}{j\omega C3 \cdot R21 + 1} \right] \right\} A \quad (4)$$

Then, since the open loop gain A is sufficiently large, the equation (4) can be modified as the following equation (5), and therefore, it will be understood that a phase-shifting amount becomes 90 degrees.

$$-e_i = e_o \left[ \frac{1}{A} + j\omega C3 \cdot R21 \right] \quad (5)$$

$$-e^i \approx e_o j\omega C3 + R21$$

Next, an operation in a direct current will be described. The negative feeding-back in an alternating current is performed in the negative feed-back amplifier 132, but no direct current component is fed-back due to the capacitor C3. Therefore, the emitter voltage of the transistor Q45 becomes unstable, and therefore, the negative feed-back amplifier 132 does not operate. However, only a direct current component of the voltage outputted from the emitter-follower of the transistor Q45 is supplied to the low-pass filter of the resistors R29 and R22 and the capacitor C4, and to the base of the transistor Q43 of the transistors Q43 and Q44 which are connected to each other in a differential manner. A constant voltage is supplied to the base of the transistor Q44 from the constant voltage source 128, and therefore, if the base currents of the transistors Q43 and Q44 and a voltage drop due to the resistors R29 and R22 are ignored, a current division ratio of the collector current 2Io of the transistor Q51 is changed according to a difference of the both base voltages, and therefore, the collector current of the transistor Q43 is changed.

A direct current voltage at the bases of the transistor Q41 and Q42 is kept at a voltage of the constant voltage source 128, and therefore, if the base current of the transistors Q41 and Q42 and a voltage drop due to the resistors R21 and R23 are ignored, the collector currents respectively flowing through the transistors Q41 and Q42 becomes Io which is a half of the collector current 2Io of the transistor Q48.

Furthermore, since the collector current of the transistor Q46 becomes 2Io, if the base current of the transistor Q45 is small and can be ignored, the collector current of the transistor Q43 becomes Io that is obtained by subtracting the collector current of the transistor Q42 from the collector current of the transistor Q46. Then, a condition that the collector current of the transistor Q43 of the transistors Q43 and Q44 which are connected to each other in a differential manner becomes Io is that the base voltages of the transistors Q43 and Q44 must be equal to each other because the collector current of the transistor Q51 is 2Io. Therefore since the direct current voltage of the emitter of the transistor Q45 is fixed at the voltage of the constant voltage source 128, and accordingly, the negative feed-back amplifier 132 can normally operate with an operating point of the voltage.

The oscillation signal from the oscillator 122 is delayed by 90 degrees by such the 90° phase-shifter 124 to be inputted to the multiplier 12 which performs a phase-comparison, and therefore, a delayed oscillation signal is compared in phase with the color burst signal. The multiplier 12 and the LPF 22 are constructed as shown in FIG. 2, for example, and therefore, a voltage signal V1 is outputted from the LPF 22 in accordance with a phase difference between the both signals. More specifically, if the oscillation signal from the 90° phase-shifter 124 which is inputted to the input ends 14 and 16 is delayed in phase by 90 degrees with respect to the color burst signal which is inputted to the input ends 18 and 20, a state shown in the period (3) of FIG. 3 is obtained, and a state of the period (1) of FIG. 3 is obtained in a case where the both signals are in-phase, and a state of the period (2) of FIG. 3 is obtained in a case where the both signals are anti-phase.

Similar to the embodiment shown in FIG. 1, the rectangular-wave signal Va is outputted from the sampling/holding circuit 42, which is added to the rectangular-wave signal Vb from the 1H delay circuit 44 by the adder 46, and thereafter, an added signal(Va+Vb) is made be ½ by the ½ multiplication circuit 48, so that the averaged rectangular-wave signal Vc is obtained. The rectangular-wave signal Vc is smoothed by an LPF 136 to be applied to the oscillator 122 as a phase adjustment signal V10 by which a frequency and phase of the oscillation signal from the oscillator 122 can be controlled.

Therefore, the APC circuit 120 is locked such that the oscillation signal through the 90° phase-shifter 124 becomes to have a delay phase of 90 degrees with respect to the color burst signal. At that time, the oscillation signal and the color burst signal becomes to be in-phase. If the APC circuit 120 is unlocked, the phase relationship of the both signals which are inputted to the multiplier 12 is changed within a range of ±90 degrees at a center of the phase relationship at a time that the APC circuit 120 is locked. Then, the oscillation signal which is in synchronization with the color burst signal is outputted from the APC circuit 120.

According to the APC circuit 120, even if a receiving condition is bad, it is possible to stably adjust a phase of the oscillation signal from the oscillator 122.

Figure 18:
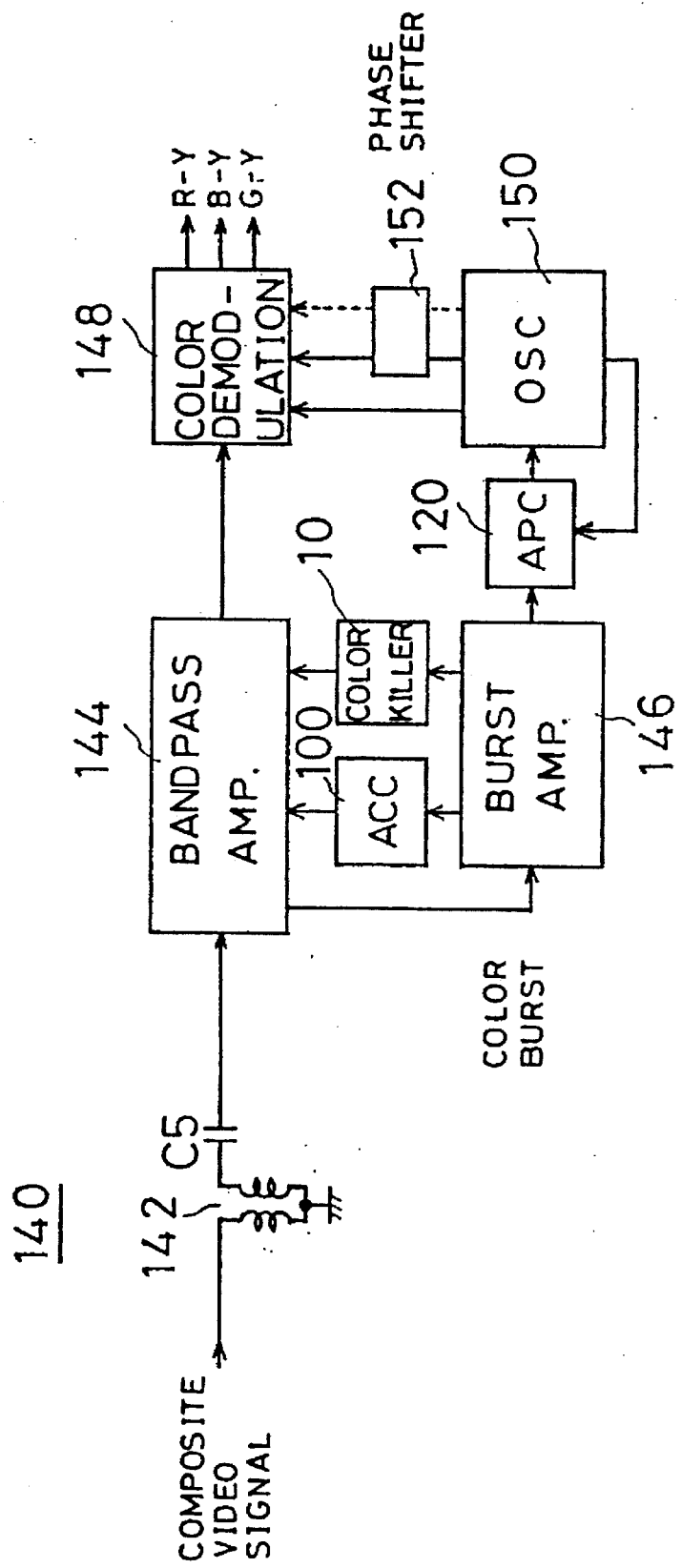
FIG. 18 is a block diagram showing one example of a television receiver of another embodiment according to the present invention.

A television receiver 140 which includes a color reproducing circuit of another embodiment according to the present invention is shown in FIG. 18. In addition, in the following, the television receiver 140 of the NTSC system will be described; however, it is needless to say that the present invention is applicable an arbitrary television system such as the PAL system, SECAM system and etc.

Figure 19A:
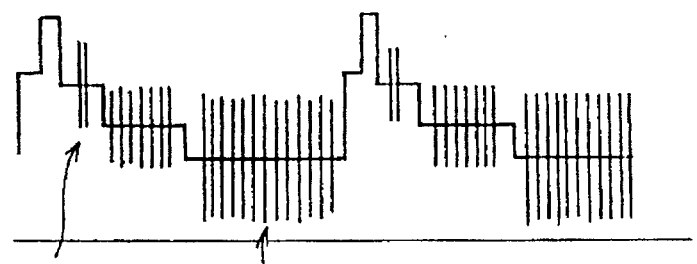
FIGS. 19A–B are wave-forms showing an operation of a transformer used in FIG. 18 embodiment.
Figure 19B:
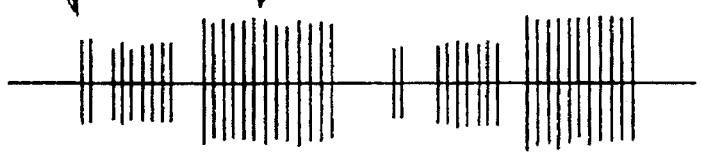
Figure 20:
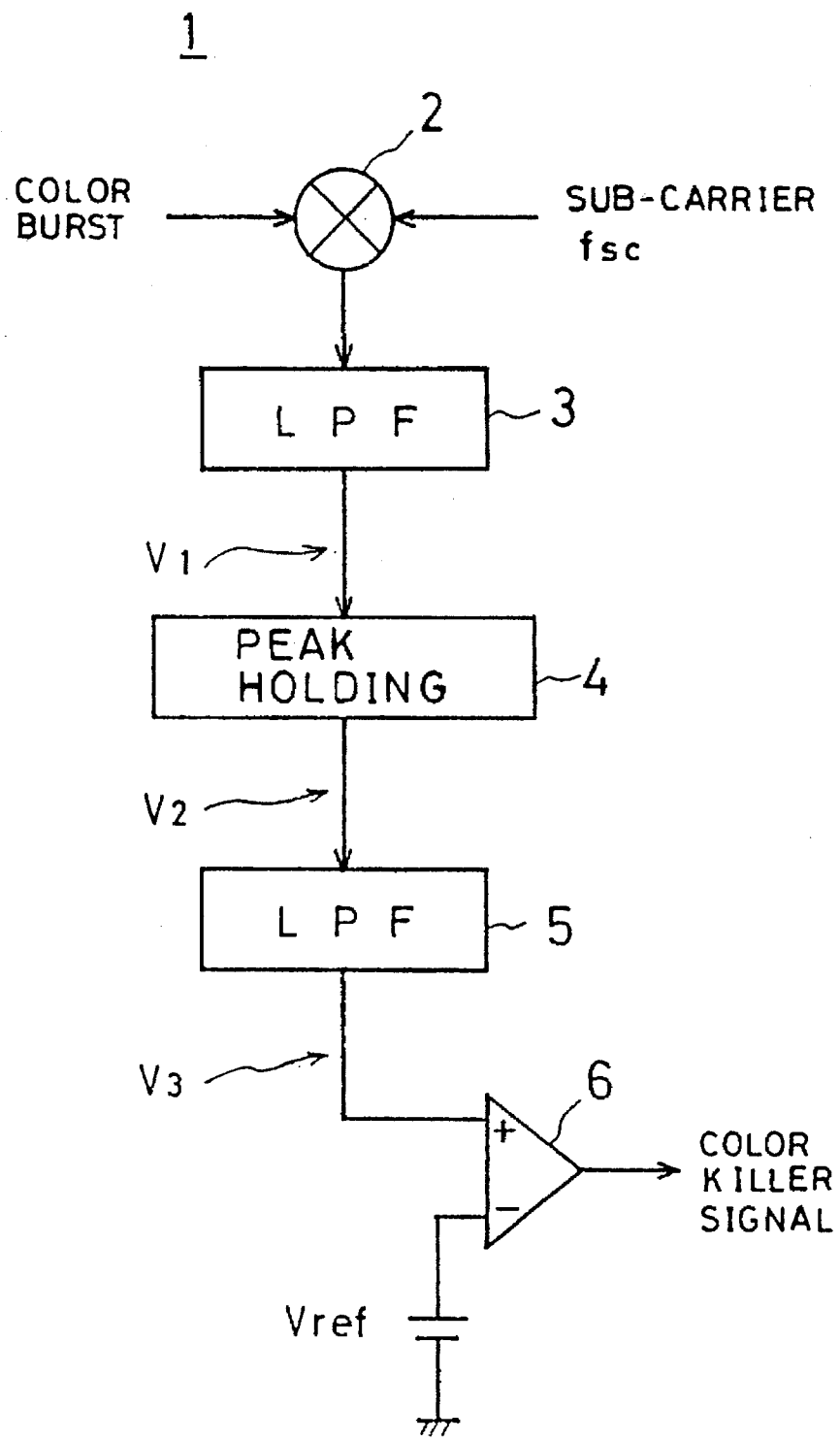
FIG. 20 is a block diagram showing a color killer circuit of a prior art.

The television receiver 140 including the color reproducing circuit includes a transformer 142 which is a bandpass transformer of 3.58 MHz±0.5 MHz. Therefore, a signal of a frequency band of 3–4 MHz included in a composite video signal shown in FIG. 19(A), that is, the carrier color signal and the color burst signal are outputted at a secondary side of the transformer 142. A direct current component included in the signal outputted from the transformer 142 is removed through a capacitor C5, becoming a wave-form as shown in FIG. 19(B). The signal is separated into the carrier color signal and the color burst signal by the bandpass amplifier 144, and the color burst signal is amplified by a burst amplifier 146 to be applied to the color killer circuit 10, the ACC circuit 100 and the APC circuit 120. The color killer circuit 10 controls an operation of the bandpass amplifier 144 in accordance with the presence or the absence of the color burst signal. That is, in a case where there is no color burst signal, the operation of the bandpass amplifier 144 is stopped because the monochrome television signal is received. On the other hand, in a case where there is the color burst signal, the bandpass amplifier 144 is operated because the color television signal is received. Furthermore, the ACC circuit 100 adjusts a gain of the bandpass amplifier 144 in accordance with an amplitude of the color burst signal. That is, if the amplitude of the color burst signal is large, the gain of the bandpass amplifier 144 is made be small, and if the amplitude of the color burst signal is small, the gain is made be large.

Furthermore, the carrier color signal is applied to a color demodulation circuit 148 from the bandpass amplifier 144, and therefore, original color difference signals (R-Y, B-Y, and G-Y) can be withdrawn from the carrier color signal. At that time, it becomes necessary to obtain a carrier wave signal having a phase which is the same as that of the sub-carrier signal of 3.58 MHz and utilized for producing the carrier color signal at a transmitter side. Therefore, an oscillator 150 outputs an oscillation signal of the 3.58 MHz. Then, a phase of the oscillation signal of the oscillator 150 is made be coincident with the phase of the color burst signal of the 3.58 MHz by the APC circuit 120.

In addition, the oscillation signal from the oscillator 150 is directly applied to the color demodulation circuit 148 and the oscillation signal is further applied to the color demodulation circuit 148 through a phase-shifter 152, and therefore, the color different signals (R-Y, B-Y, and G-Y) are withdrawn from the color demodulation circuit 148.

It is to be noted that the circuits shown in FIG. 1, FIG. 11 and FIG. 16 are utilized for the color killer circuit 10, the ACC circuit 100 and the APC circuit 120. By utilizing such the circuits, it is possible to obtain the color reproducing circuit or the television receiver which is resistant to a noise.

An averaging circuit which is shown in FIG. 7 and includes the (1−K) multiplication circuit 56, the adder 58, the K multiplication circuit 60 and the 1H delay circuit 44 may be utilized in the ACC circuit 100 shown in FIG. 11 and the APC circuit 120 shown in FIG. 16. Furthermore, as the 1H delay circuit 44 of the ACC circuit 100 and/or the APC circuit 120, a circuit shown in FIG. 9 can be utilized. Moreover, it is needless to say that such the ACC circuit 100 and/or the APC circuit 120 and the color killer circuit 10 shown in FIG. 7 may be utilized for the television receiver 140 shown in FIG. 18.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television circuit utilizing a color burst signal, comprising:

a first voltage signal outputting means for outputting a first voltage signal by detecting the color burst signal;

a sampling/holding means which receives the first voltage signal and outputs a sample/hold signal;

an averaging means, operably coupled to said sampling/holding means, for averaging said sample/hold signal and a delayed signal of said sample/hold signal, said averaging means including a delay means for delaying said sample/hold signal by one horizontal line period and outputting said delayed signal; and a signal detecting means, operably coupled to said averaging means, for outputting a signal on the basis of an averaged output from said averaging means.

2. A circuit according to claim 1, wherein said averaging means includes a simple averaging means for simply averaging the first voltage signal and the delayed signal from said delay means.

3. A circuit according to claim 1, wherein said averaging means includes a weightedly averaging means for weightedly averaging the first voltage signal and the delayed signal from said delay means.

4. A color killer circuit, comprising:
a first voltage signal outputting means for outputting a first voltage signal by detecting the color burst signal;
a sampling/holding means which receives the first voltage signal and outputs a sample/hold signal;
an averaging means, operably coupled to said sampling/holding means, for averaging said sample/hold signal and a delayed signal of said sample/hold signal, said averaging means including a delay means for delaying said sample/hold signal by one horizontal line period and outputting said delayed signal; and
a signal detecting means, operably coupled to said averaging means, for outputting a color killer signal on the basis of an averaged output from said averaging means.

5. A color killer circuit according to claim 4, wherein said averaging means includes a simple averaging means for simply averaging the first voltage signal and the delayed signal from said delay means.

6. A color killer circuit according to claim 4, wherein said averaging means includes a weightedly averaging means for weightedly averaging the first voltage signal and the delayed signal from said delay means.

7. A color killer circuit according to claim 4, wherein said first voltage signal outputting means includes a second voltage signal outputting means for outputting a second voltage signal according to presence or absence of the color burst signal, and a peak holding means for holding a peak value of the second voltage signal so as to output a peak hold signal to said sampling/holding means.

8. A color killer circuit according to claim 7, wherein said second voltage signal outputting means includes phase-comparing means for phase-comparing the color burst signal and a sub-carrier signal, and first smoothing means for smoothing an output from the phase comparing means to apply the same to said peak holding means.

9. A color killer circuit according to any one of claims 4 to 8, wherein said signal detecting means includes second smoothing means for smoothing the averaged output, and determining means for outputting the color killer signal on the basis of an output from the second smoothing means.

10. A color reproducing circuit, comprising:
a first amplifier for separating a color signal and a color burst signal from each other;
a color killer circuit for controlling an operation of said first amplifier in accordance with presence and absence of the color burst signal;
an ACC circuit for adjusting a gain of said first amplifier in accordance with an amplitude of the color burst signal;
a color demodulator for outputting a color difference signal on the basis of the color signal;
an oscillator for applying an oscillation signal having a phase that is coincident with a phase of a sub-carrier; and
an APC circuit for adjusting the phase of the oscillation signal to be coincident with a phase of the color burst signal,
wherein said color killer circuit includes a third voltage signal outputting means for outputting a third voltage signal on the basis of the color burst signal, first averaging means for averaging said third voltage signal, and means for outputting a color killer signal on the basis of an averaged output from said first averaging means.

11. A television receiver, comprising:
a first amplifier for separating a color signal and a color burst signal from each other;
a color killer circuit for controlling an operation of said first amplifier in accordance with presence and absence of the color burst signal;
an ACC circuit for adjusting a gain of said first amplifier in accordance with an amplitude of the color burst signal;
a color demodulator for outputting a color difference signal on the basis of the color signal;
an oscillator for applying an oscillation signal having a phase that is coincident with a phase of a sub-carrier; and
an APC circuit for adjusting the phase of the oscillation signal to be coincident with a phase of the color burst signal,
wherein said color killer circuit includes a third voltage signal outputting means for outputting a third voltage signal on the basis of the color burst signal, first averaging means for averaging said third voltage signal, and means for outputting a color killer signal on the basis of an averaged output from said first averaging means.

12. A television signal receiving system, comprising:
a first amplifier for separating a color signal and a color burst signal from each other;
a color killer circuit for controlling an operation of said first amplifier in accordance with presence and absence of the color burst signal;
an ACC circuit for adjusting a gain of said first amplifier in accordance with an amplitude of the color burst signal;
a color demodulator for outputting a color difference signal on the basis of the color signal;
an oscillator for applying an oscillation signal having a phase that is coincident with a phase of a sub-carrier; and
an APC circuit for adjusting the phase of the oscillation signal to be coincident with a phase of the color burst signal,
wherein said color killer circuit includes a third voltage signal outputting means for outputting a third voltage signal on the basis of the color burst signal, first averaging means for averaging said third voltage signal, and means for outputting a color killer signal on the basis of an averaged output from said first averaging means.

* * * * *